(12) United States Patent
Zhao et al.

(10) Patent No.: US 11,001,395 B2
(45) Date of Patent: May 11, 2021

(54) PAYLOAD MOUNTING PLATFORM

(71) Applicant: SZ DJI TECHNOLOGY CO., LTD., Shenzhen (CN)

(72) Inventors: Tao Zhao, Shenzhen (CN); Xi Feng Zhao, Shenzhen (CN); Yong Wang, Shenzhen (CN); Li Zhou, Shenzhen (CN); Tao Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/783,586

(22) Filed: Feb. 6, 2020

(65) Prior Publication Data

US 2020/0262581 A1    Aug. 20, 2020

Related U.S. Application Data

(63) Continuation of application No. 16/247,066, filed on Jan. 14, 2019, now Pat. No. 10,556,708, which is a
(Continued)

(30) Foreign Application Priority Data

| Mar. 31, 2013 | (CN) | 201310109629.5 |
| Mar. 31, 2013 | (CN) | 201310109643.5 |

(Continued)

(51) Int. Cl.
*B64D 47/08* (2006.01)
*F16M 11/10* (2006.01)
(Continued)

(52) U.S. Cl.
CPC ............. *B64D 47/08* (2013.01); *F16M 11/10* (2013.01); *F16M 11/18* (2013.01);
(Continued)

(58) Field of Classification Search
CPC .............................. B64D 47/08; G03B 15/006
See application file for complete search history.

(56) References Cited

U.S. PATENT DOCUMENTS

| 4,728,839 A | 3/1988 | Coughlan et al. |
| 5,223,872 A | 6/1993 | Stiepel et al. |
(Continued)

FOREIGN PATENT DOCUMENTS

| CN | 1365877 A | 8/2002 |
| CN | 1372435 A | 10/2002 |
(Continued)

OTHER PUBLICATIONS

Suling Li, Bearing, Mechanical Basics, p. 44, Central University for Nationalities Press, Beijing, China. (Translation included).
Dejian Wang, et al., Turbine Bearing Overhaul, Steam Turbine Equipment Overhaul, pp. 113-114, China Electric Power Press, China. (Translation included).
(Continued)

*Primary Examiner* — Clayton E. LaBalle
*Assistant Examiner* — Dennis Hancock
(74) *Attorney, Agent, or Firm* — Anova Law Group, PLLC

(57) ABSTRACT

An apparatus for supporting a payload includes a payload mount configured to be coupled to the payload to secure the payload, a first support member coupled to one side of the payload mount in a single arm configuration and including a first actuation unit configured to rotate the payload mount around a first rotational axis relative to the first support member, and a single flexible member including a branched configuration. The branched configuration includes at least a first end that is electrically coupled to the payload mount and a second end that is electrically coupled to the first actuation unit.

20 Claims, 18 Drawing Sheets

Related U.S. Application Data continuation of application No. 15/605,892, filed on May 25, 2017, now Pat. No. 10,179,658, which is a continuation of application No. 14/877,435, filed on Oct. 7, 2015, now Pat. No. 9,663,245, which is a continuation of application No. PCT/CN2014/073725, filed on Mar. 19, 2014.

(30) Foreign Application Priority Data

| Mar. 31, 2013 | (CN) | ................ | 201310109693.3 |
| --- | --- | --- | --- |
| Mar. 31, 2013 | (CN) | ................ | 201310109706.7 |
| Mar. 31, 2013 | (CN) | ................ | 201310109707.1 |

(51) Int. Cl.
| | |
| --- | --- |
| *F16M 11/20* | (2006.01) |
| *F16M 11/42* | (2006.01) |
| *G03B 15/00* | (2021.01) |
| *F16M 11/18* | (2006.01) |
| *G03B 17/56* | (2021.01) |
| *B64C 39/02* | (2006.01) |

(52) U.S. Cl.
CPC ......... *F16M 11/2028* (2013.01); *F16M 11/42* (2013.01); *G03B 15/006* (2013.01); *G03B 17/561* (2013.01); *B64C 39/024* (2013.01); *B64C 2201/127* (2013.01); *B64C 2201/128* (2013.01)

(56) References Cited

U.S. PATENT DOCUMENTS

| | | | |
| --- | --- | --- | --- |
| 5,497,214 A | 3/1996 | Labree | |
| 6,268,556 B1 | 7/2001 | Liao | |
| 6,628,338 B1 | 9/2003 | Elberbaum et al. | |
| 6,965,411 B1 | 11/2005 | Jones | |
| 8,016,254 B2 | 9/2011 | Tschaggeny et al. | |
| 8,317,152 B1 | 11/2012 | Zhou | |
| 9,663,244 B2 | 5/2017 | Zhao et al. | |
| 9,663,245 B2 | 5/2017 | Zhao et al. | |
| 10,179,658 B2 * | 1/2019 | Zhao | F16M 11/42 |
| 2001/0055487 A1 * | 12/2001 | Akada | H04N 5/23299 |
| | | | 396/427 |
| 2009/0249900 A1 | 10/2009 | Tschaggeny et al. | |
| 2010/0019902 A1 | 1/2010 | Mullet | |
| 2010/0051774 A1 | 3/2010 | Shi et al. | |
| 2010/0066831 A1 | 3/2010 | Origuchi | |
| 2010/0067180 A1 * | 3/2010 | Origuchi | F16M 11/18 |
| | | | 361/679.01 |
| 2010/0079101 A1 | 4/2010 | Sidman | |
| 2011/0033179 A1 | 2/2011 | Sasaki | |
| 2011/0117230 A1 | 5/2011 | O'Hara | |
| 2011/0221900 A1 | 9/2011 | Reich | |
| 2012/0188441 A1 | 7/2012 | Takizawa | |
| 2013/0051782 A1 | 2/2013 | Dimotakis | |
| 2014/0316614 A1 | 10/2014 | Newman | |
| 2016/0016674 A1 | 1/2016 | Zhao et al. | |
| 2016/0023778 A1 | 1/2016 | Zhao et al. | |

FOREIGN PATENT DOCUMENTS

| | | |
| --- | --- | --- |
| CN | 1683123 A | 10/2005 |
| CN | 2746423 Y | 12/2005 |
| CN | 1728774 A | 2/2006 |
| CN | 1742523 A | 3/2006 |
| CN | 1897738 A | 1/2007 |
| CN | 101277006 A | 10/2008 |
| CN | 201173371 Y | 12/2008 |
| CN | 101476881 A | 7/2009 |
| CN | 101618678 A | 1/2010 |
| CN | 201412645 Y | 2/2010 |
| CN | 101666898 A | 3/2010 |
| CN | 101734377 A | 6/2010 |
| CN | 101821052 A | 9/2010 |
| CN | 201661231 U | 12/2010 |
| CN | 201723947 U | 1/2011 |
| CN | 102303707 A | 1/2012 |
| CN | 202109170 U | 1/2012 |
| CN | 202295294 U | 7/2012 |
| CN | 202392373 U | 8/2012 |
| CN | 102893505 A | 1/2013 |
| CN | 202647108 U | 1/2013 |
| CN | 202647109 U | 1/2013 |
| CN | 203131382 U | 8/2013 |
| CN | 203133618 U | 8/2013 |
| CN | 203135367 U | 8/2013 |
| CN | 203286221 U | 11/2013 |
| CN | 203286222 U | 11/2013 |
| CN | 203445578 U | 2/2014 |
| CN | 104075093 A | 10/2014 |
| CN | 104075093 B | 8/2016 |
| EP | 0798844 A | 10/1997 |
| EP | 2192444 A1 | 6/2010 |
| JP | H0556800 U | 7/1993 |
| JP | H10146002 A | 5/1998 |
| JP | 2000134532 A | 5/2000 |
| JP | 2004242128 A | 8/2004 |
| JP | 2008085597 A | 4/2008 |
| JP | 2008112678 A | 5/2008 |
| JP | 2008167257 A | 7/2008 |
| JP | 2010074476 A | 4/2010 |
| JP | 2010074477 A | 4/2010 |
| JP | 2010078154 A | 4/2010 |
| JP | 2011221357 A | 11/2011 |
| JP | 2012052894 A | 3/2012 |
| WO | 2010031486 A1 | 3/2010 |
| WO | 2013022885 A1 | 2/2013 |

OTHER PUBLICATIONS

Yu, et al. Design and implementation of Pan-tilt Control System in UAV. Automation & Instrumentation. 2012. pp. 48-51 (in Chinese with English abstract).
The European Patent Office (EPO) European Search Report and Opinion for EP Application No. 14780088.2 dated Mar. 11, 2016.
The World Intellectual Property Organization (WIPO) International Search Report and Written Opinion for PCT/CN2014/073725 dated Jul. 10, 2014.
Liu, et al. Assembly Automation. 2nd Ed. China Machine Press. May 2007. p. 159 (with English traslation).
The United States Patent and Trademark Office (USPTO) Notice of Allowance for U.S. Appl. No. 14/356,577 dated Jan. 17, 2017.
The United States Patent and Trademark Office (USPTO) Notice of Allowance for U.S. Appl. No. 14/877,435 dated Mar. 1, 2017.
The United States Patent and Trademark Office (USPTO) Notice of Allowance for U.S. Appl. No. 14/356,577 dated Mar. 21, 2017.
The United States Patent and Trademark Office (USPTO) Notice of Allowance for U.S. Appl. No. 14/877,435 dated Mar. 24, 2017.
The United States Patent and Trademark Office (USPTO) Notice of Allowance for U.S. Appl. No. 14/877,435 dated May 25, 2016.
The United States Patent and Trademark Office (USPTO) Notice of Allowance for U.S. Appl. No. 14/877,435 dated Jul. 1, 2016.
The United States Patent and Trademark Office (USPTO) Office Action for U.S. Appl. No. 14/877,435 dated Feb. 3, 2016.
The United States Patent and Trademark Office (USPTO) Office Action for U.S. Appl. No. 14/356,577 dated Sep. 9, 2016.
The United States Patent and Trademark Office (USPTO) Office Action for U.S. Appl. No. 14/877,435 dated Sep. 23, 2016.
WAN, Design of motion control system and tracked mobile robot, Control Theory & Control Engineering, Nanjing University of Science and Technology Jun. 20, 2010, 25 pages. (in Chinese with English translation).
Zhang, et al., Robot System Design and Algorithm, University of Science and Technology of China Press, Oct. 2008, pp. 67 to 68 (with English translation).

* cited by examiner

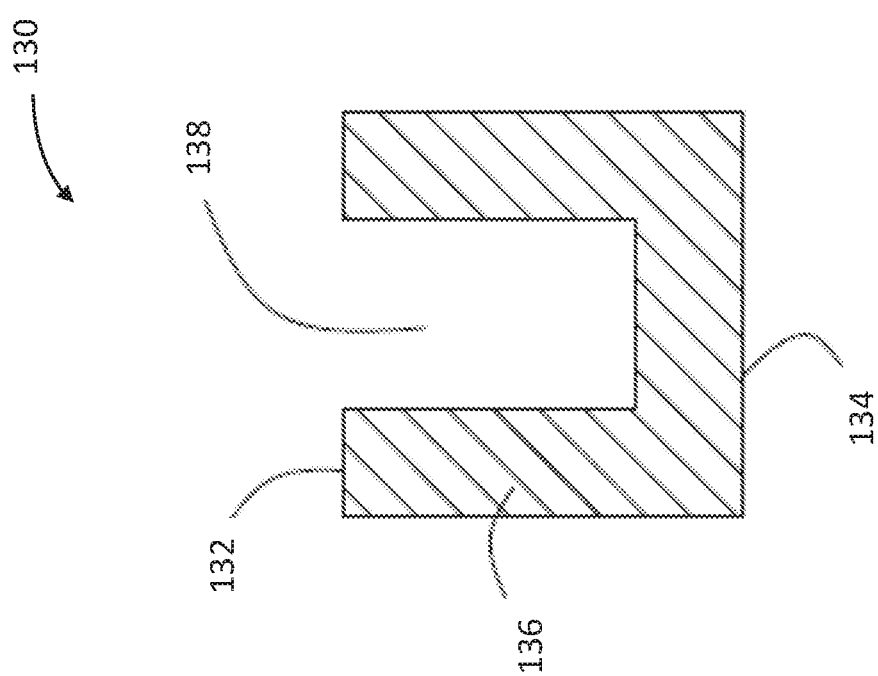

PAYLOAD MOUNTING PLATFORM

CROSS-REFERENCE

This application is a continuation application of U.S. patent application Ser. No. 16/247,066, filed on Jan. 14, 2019, which is a continuation application of U.S. patent application Ser. No. 15/605,892, filed on May 25, 2017, now U.S. Pat. No. 10,179,658, which is a continuation application of U.S. patent application Ser. No. 14/877,435, filed on Oct. 7, 2015, now U.S. Pat. No. 9,663,245, which is a continuation application of International Application No. PCT/CN2014/073725, filed on Mar. 19, 2014, which claims the benefit of the following applications: Chinese Application No. 201310109629.5, Chinese Application No. 201310109643.5, Chinese Application No. 201310109693.3, Chinese Application No. 201310109707.1, and Chinese Application No. 201310109706.7, all filed on Mar. 31, 2013. The disclosures of each of these applications are hereby incorporated by reference in their entirety.

BACKGROUND

Movable objects such as unmanned aerial vehicles can be used for performing surveillance, reconnaissance, and exploration tasks for military and civilian applications. Such vehicles may carry a payload configured to perform a specific function. Typically, the payload is coupled to the vehicle via a suitable mounting platform, which may be used to control the spatial disposition (e.g., position and/or orientation of the payload). For example, an unmanned aerial vehicle used for aerial photography may be equipped with a gimbal for carrying a camera.

In some instances, the design of existing mounting platforms may be less than optimal. For example, existing platforms may be relatively large and heavy, which may be disadvantageous for use in aerial vehicle-based applications. Additionally, the electrical couplings of existing mounting platforms may utilize wires or cables that become easily entangled, thus interfering with the operation of the platform. Furthermore, drive controllers for existing platforms may operate without the use of feedback mechanisms, which may reduce the overall driving precision.

SUMMARY

The systems, devices, and methods described herein relate to improved mounting platforms used for coupling a payload to a movable object. A mounting platform can include a plurality of support members for coupling and rotating a payload mount used to secure a payload. A flexible member can be used to electrically couple various components of the mounting platform, such as the support members and/or the payload mount. In some embodiments, the flexible member is wound around specified portions of the platform, such that rotation of the components of the platform relative to each other (e.g., the support members, payload mount) causes the flexible member to wind or unwind in an orderly fashion. Furthermore, sensors can be integrated into the support members and/or payload mount so as to provide feedback for controlling the rotation of the platform components described herein. The techniques described herein can be used to provide a compact mounting platform design that rotates smoothly and precisely, thus providing improved control of the spatial disposition of a coupled payload.

Thus, in one aspect, an apparatus for supporting a payload is provided. The apparatus comprises: a first support member coupled to the payload and configured to rotate the payload; a second support member coupled to the first support member and configured to rotate the first support member relative to the second support member; and a flexible member electrically coupling the first and second support members, wherein a length of the flexible member winds around a portion of the first support member or second support member, such that the length winds up around the portion when the first support member is rotated in a first direction and unwinds from the portion when the first support member is rotated in a second direction.

In some embodiments, the first support member can include a first actuation unit configured to rotate the payload. The second support member can include a second actuation unit configured to rotate the first support member relative to the second support member. The flexible member can electrically couple the first and second actuation units.

In some embodiments, the first support member can rotate the payload about a first rotational axis and the second support member can rotate the first support member about a second rotational axis different from the first rotational axis. The first and second rotational axes can be selected from two of the following: a roll axis, a pitch axis, or a yaw axis. The first and second rotational axes can intersect.

In some embodiments, the payload can include a camera or a microphone. The flexible member can be a flexible printed circuit, electrical wire, or flat cable.

In some embodiments, rotation of the first support member along at least one of the first and second directions can be constrained by stops. The stops can be situated on the second support member. The positioning of the stops can determine a maximum rotation angle along said at least one of the first and second directions.

In another aspect, a method for supporting a payload comprises: providing the aforementioned apparatus; and rotating the first support member relative to the second support member along the first direction or the second direction.

In another aspect, an unmanned aerial vehicle comprises: a vehicle body carrying the aforementioned apparatus; and a payload coupled to the first support member of the apparatus.

In another aspect, an apparatus for supporting a payload is provided. The apparatus comprises: a payload mount configured to mechanically couple to the payload; a first support member coupled to the payload mount and configured to rotate the payload mount relative to the first support member; and a flexible member electrically coupling the first support member and the payload mount, wherein a length of the flexible member winds around a portion of the first support member or the payload mount, such that the length winds up around the portion when the payload mount is rotated in a first direction and unwinds from the portion when the payload mount is rotated in a second direction.

In some embodiments, the first support member can include a first actuation unit configured to rotate the payload mount relative to the first support member. The flexible member can electrically couple the first actuation unit to the payload mount. The first support member can rotate the payload mount about a roll axis, a pitch axis, or a yaw axis.

In some embodiments, the payload can include a camera or a microphone. The payload can be releasably coupled to the payload mount. The payload mount can include a detection module configured to detect a spatial disposition of the payload. The payload can be electrically coupled to the payload mount. The flexible member can be a flexible printed circuit, electrical wire, or flat cable.

In another aspect, a method for supporting a payload comprises: providing the aforementioned apparatus; and rotating the payload mount relative to the first support member along the first direction or the second direction.

In another aspect, an unmanned aerial vehicle comprises: a vehicle body carrying the aforementioned apparatus; and a payload coupled to the payload mount of the apparatus.

In another aspect, an apparatus for supporting a payload mount is provided. The apparatus comprises: a payload mount configured to mechanically couple to the payload; a first support member coupled to the payload mount and configured to rotate the payload mount relative to the first support member; a second support member coupled to the first support member and configured to rotate the first support member relative to the second support member; and a flexible member electrically coupling the first support member, second support member, and the payload mount, wherein a first length of the flexible member winds around a distal portion of the first support member or a proximal portion of the payload mount, and rotation of the payload mount relative to the first support member causes winding or unwinding of the second length around the distal portion of the first support member of the proximal portion of the payload mount; and wherein a second length of the flexible member winds around a proximal portion of the first support member or a distal portion of the second support member, and rotation of the first support member relative to the second support member causes winding or unwinding of the first length around the proximal portion of the first support member of the distal portion of the second support member.

In some embodiments, the proximal portion of the payload mount can be coupled to the distal portion of the first support member, and the proximal portion of the first support member can be coupled to the distal portion of the second support member. The first support member can include a first actuation unit configured to rotate the payload mount relative to the first support unit. The second support member can include a second actuation unit configured to rotate the payload mount relative to the first support unit. The flexible member can electrically couple the first actuation unit, second actuation unit, and the payload mount.

In some embodiments, the first support member can rotate the payload about a first rotational axis and the second support member can rotate the first support member about a second rotational axis different from the first rotational axis. The first and second rotational axes can be selected from two of the following: a roll axis, a pitch axis, or a yaw axis.

In some embodiments, the payload can include a camera or a microphone. The flexible member can be a flexible printed circuit, electrical wire, or flat cable.

In some embodiments, the payload mount can include a detection module configured to detect a spatial disposition of the payload. The payload can be electrically coupled to the payload mount.

In another aspect, a method for supporting a payload comprises: providing the aforementioned apparatus; rotating the first support member relative to the second support member; and rotating the payload mount relative to the first support member.

In another aspect, an unmanned aerial vehicle comprises: a vehicle body carrying the aforementioned apparatus; and a payload coupled to the payload mount of the apparatus.

It shall be understood that different aspects of the disclosure can be appreciated individually, collectively, or in combination with each other. Various aspects of the disclosure described herein may be applied to any of the particular applications set forth below or for any other types of movable objects. Any description herein of movable objects, such as an aerial vehicle, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIGS. 1B through 1D illustrate cross-sectional views of various winding portions for rotary couplings, in accordance with embodiments;

DETAILED DESCRIPTION

Figure 1A:
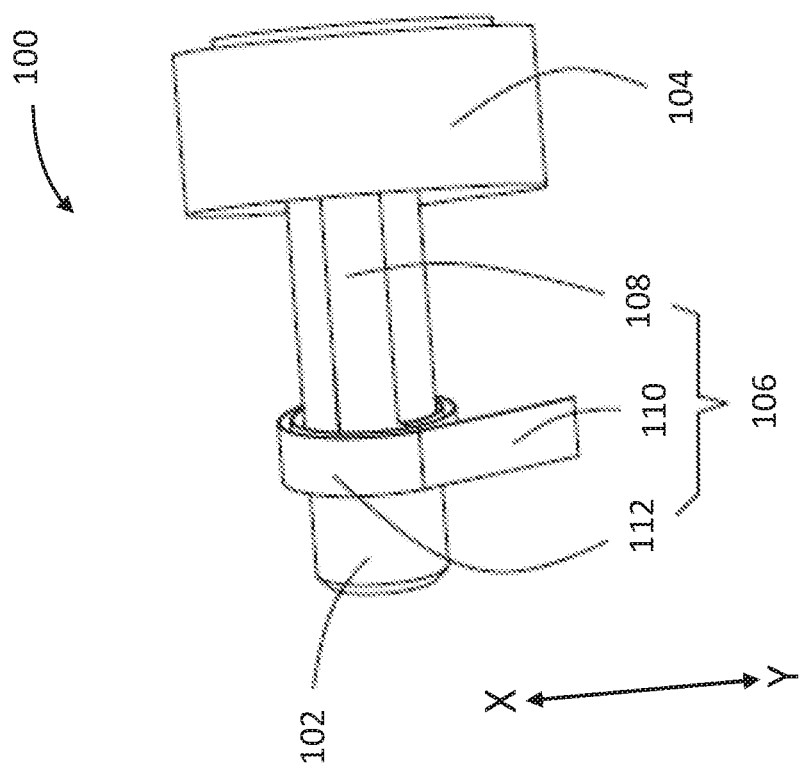
FIG. 1A illustrates an electromechanical rotary coupling, in accordance with embodiments.

The systems, devices, and methods of the present disclosure provide improved mounting platforms for coupling a payload to a movable object, such as an unmanned aerial vehicle (UAV). The mounting platforms described herein can include a payload mount for supporting the payload, a plurality of support members enabling rotation of the payload mount, and a flexible member electrically coupling at least some of the support members and/or payload mount. In contrast to existing "double arm" mounting platforms, which typically utilize a pair of support members coupled to opposite sides of a payload to rotate the payload, the "single arm" mounting platforms described herein rotate the payload using a single support member coupled to one side of the payload mount, thereby providing a more compact and lightweight platform. Additionally, it can be very difficult to achieve precise and accurate alignment of the paired support members in a double arm platform, which may result in reduced precision of payload rotation and increased rotational friction. The single arm platforms described herein avoid this problem and thus may provide improved control over payload orientation. Furthermore, the flexible member can be configured to wind or unwind about a portion of the support members and/or payload, thus preventing the flexible member from becoming entangled as these components rotate relative to each other.

For example, a mounting platform can be used to mount a payload, such as an imaging device, to a UAV. The mounting platform can include at least two support members used to control the spatial disposition of a payload mount securing the imaging device relative so as to control the orientation of the imaging device relative to the UAV with respect to at least two degrees of freedom. A flexible member can be used to couple the support members and the payload mount, thus enabling the transmission of power and/or data between these components. In some embodiments, the data may include position data that can be used as feedback for controlling the rotation of the support members and/or payload mount.

Thus, in one aspect, the present disclosure provides an apparatus for supporting a payload having one or more of the following unique features. In some embodiments, the apparatus can include a payload mount configured to mechanically couple to the payload; a first support member coupled to the payload mount and configured to rotate the payload mount relative to the first support member; a second support member coupled to the first support member and configured to rotate the first support member relative to the second support member; and a flexible member electrically coupling the first support member, second support member, and the payload mount. A first length of the flexible member may wind around a proximal portion of the first support member or a distal portion of the second support member, and rotation of the first support member relative to the second support member causes winding or unwinding of the first length around the proximal portion of the first support member of the distal portion of the second support member. A second length of the flexible member may wind around a distal portion of the first support member or a proximal portion of the payload mount, and rotation of the payload mount relative to the first support member causes winding or unwinding of the second length around the distal portion of the first support member of the proximal portion of the payload mount.

A payload of the present disclosure can include non-living entities (e.g., cargo, equipment, instruments) as well as living entities (e.g., passengers). The payload may be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an imaging device (e.g., a camera such as a mirrorless interchangeable lens camera or video camera, a mobile device including a camera such as a smartphone), an audio capture device (e.g., a microphone such as a parabolic microphone), an infrared imaging device, or an ultraviolet imaging device. The sensor can provide static sensing data (e.g., a photograph) or dynamic sensing data (e.g., a video). In some embodiments, the sensor provides sensing data for an object targeted by the payload (e.g., an object targeted for surveillance). Alternatively or in combination, the payload can include one or more emitters for providing signals to one or more targets. Any suitable emitter can be used, such as an illumination source or a sound source. In some embodiments, the payload includes one or more transceivers, such as for communication with a remote entity. Optionally, the payload can be configured to interact with the environment or a target. For example, the payload can include a tool, instrument, or mechanism capable of manipulating objects, such as a robotic arm.

In some embodiments, the payload can be carried by a movable object. The movable object can be configured to support some or all of the weight of the payload. The payload can be coupled to the movable object using a mounting platform, which may also be referred to herein as a "carrier" or a "gimbal assembly." The mounting platform can be coupled to the movable object, either directly or indirectly, and the coupling may be a permanent coupling or a releasable coupling. The coupling between the movable object and the mounting platform may permit motion of the mounting platform relative to the movable object (e.g., up to three degrees of freedom in translation and/or up to three degrees of freedom in rotation). Alternatively, the spatial disposition of the mounting platform may be fixed relative to the movable object.

The payload may be integrally formed with the mounting platform. Alternatively, the payload provided separately from and coupled to the mounting platform. The coupling may be a permanent coupling or a releasable coupling. For example, the payload may be coupled to the mounting platform using adhesives, bonding, welding, fasteners (e.g., screws, nuts, bolts, pins), interference fits, snap fits, and the like. The coupling may fix the payload at specified position and/or orientation relative to the mounting platform. Alternatively, the coupling may permit movement of the payload with respect to the mounting platform (e.g., with up to six degrees of freedom of motion). In some embodiments, the payload can be indirectly coupled to the mounting platform, such as via a payload mount. The payload mount can be a bracket, frame, cradle, clamp, or any other suitable device adapted to secure and support the payload. In some embodiments, the payload mount may also electrically couple the payload, as described below.

The mounting platform can be configured to control a state of the payload, such as the spatial disposition of the payload (e.g., position and/or orientation), movement of the payload (e.g., translational velocity and/or acceleration with up to three degrees of freedom, rotational velocity and/or acceleration with up to three degrees of freedom). The mounting platform may directly manipulate the payload, or may indirectly control the spatial disposition of the payload by controlling the spatial disposition of a payload mount supporting the payload. For example, the mounting platform may include one or more support members (e.g., arms, frames, gimbals, or other supporting devices) directing the movement of the payload and/or payload mount relative to the movable object. Any description herein relating to movement of a payload can also be applied to movement of a payload mount securing the payload, or vice-versa. In some embodiments, the mounting platform can permit the payload to move relative to the movable object (e.g., with respect to one, two, or three degrees of translation and/or one, two, or three degrees of rotation). Conversely, the mounting platform can constrain the movement of the payload relative to the movable object along one or more directions. For example, the mounting platform can maintain the payload at a specified position and/or orientation. As another example, the mounting platform can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target). In some embodiments, the mounting platform can be adapted to reduce or prevent certain movements of the payload. For example, the mounting platform may include one or more stabilizing elements (e.g., dampers) for reducing or eliminating unwanted motions of the payload (e.g., shaking and/or vibrations).

In some embodiments, when the payload is an imaging device, the mounting platform can be configured to control a field of view of the imaging device. The mounting platform may control the field of view by controlling the spatial disposition of the imaging device, as described above. Alternatively or in addition, the field of view can be changed by controlling suitable functions of the imaging device, such as by controlling the zoom level, viewing angle, focus, etc. of the imaging device.

The mounting platforms described herein may include one or more rotary couplings. A rotary coupling can be used to mechanically couple any number of components, such as two, three, four, five, or more components. Rotary couplings can be used to join at least one stationary component and at least one rotating component, or two or more components that rotate relative to each other. For example, rotary couplings can be used to join two support members of a mounting platform, or a support member and a payload mount, as discussed below. In some embodiments, the rotary couplings may be electromechanical rotary couplings enabling the transmission of electrical signals across the rotary interface. The electrical signals can be transmitted between the coupled components. Alternatively or in addition, an electromechanical rotary coupling may enable electrical signals to be transmitted between at least one of the coupled components and another component separate from the coupled components. The separate component may or may not be coupled (e.g., directly or indirectly) to one or more components of the electromechanical rotary coupling. At least one of the coupled components may rotate relative to the separate component. Some examples of electrical signals that may be transmitted via an electromechanical rotary coupling include power signals, control signals, or signals representative of data (e.g., data provided by a payload such as image data), as described in further detail below. The electrical signals can be transmitted via electrical connecting elements, such as wires, cables, pins, sockets, contacts, circuit boards, and the like. Some or all of the electrical connecting elements may rotate along with the rotation of the rotary coupling, thereby enabling continuous transmission of electrical signals during operation of the mounting platform.

FIG. 1A illustrates an electromechanical rotary coupling 100 suitable for use with any of the mounting platforms described herein, in accordance with embodiments. The coupling 100 can include a first member 102 and a second member 104 coupled to the first member 102. The first member 102 can be directly coupled to the second member 104. Alternatively, the first and second member 102, 104 can be separated by a distance and indirectly coupled via one or more intervening components. The first member 102 can be stationary and the second member 104 can be configured to rotate relative to the first member 102, or vice-versa. Conversely, in some embodiments, the first and second member 102, 104 can both rotate relative to each other. The first member 102 can support at least some of the weight of the second member 104, or vice-versa. In some instances, the first and second members 102, 104 can each be a portion of a rotating component of a mounting platform, such that the coupling 100 is a rotary joint or interface of the mounting platform.

The coupling 100 can include a flexible member 106, which can be any suitable connecting element enabling electrical communication (e.g., of power, data, etc.), such as electrical wires, electrical cables, flat cables, coaxial cables, ribbon cables, or flexible printed circuit boards (PCBs). The flexible member 106 can include one or more conductive elements supported by one or more insulating elements. The conductive elements may be embedded within, enclosed by, or disposed upon the insulating elements. The conductivity of the conductive elements may be greater than the conductivity of the insulating elements, such that electrical signals are transmitted through the conductive elements. The flexible member 106 can include a first end 108, a second end 110, and a length 112 extending between the first and second ends 108, 110. In some instances, the flexible member 106 can be formed in an "L" shape, with the first end 108 extending perpendicularly from the length 112. The first end 108 can be coupled to the second member 104, and the second end 110 can be coupled to another component (e.g., of a mounting platform having the rotary coupling 100) (not shown), thereby placing it in electrical communication with the second member 104.

In some embodiments, the length 112 of the flexible member 106 is pre-wound around a portion of the first member 102 and/or second member 104. Accordingly, as the second member 104 rotates relative to the first member 102 in a first direction X, the length 112 can be wound up around the portion, and as the second member 104 rotates relative to the first member 102 in a second direction Y, the length 112 can be at least partially unwound from the portion. The directions X and Y may be opposite rotational directions (e.g., clockwise and counterclockwise directions, respectively, or vice-versa). The winding and unwinding of the length 112 caused by the rotation of the second member 104 relative to the first member 102 may occur in an orderly manner along a trajectory defined by the pre-wound configuration of the length 112, thereby reducing the likelihood of the flexible member 106 becoming entangled during operation of the rotary coupling 100.

Figure 1B:
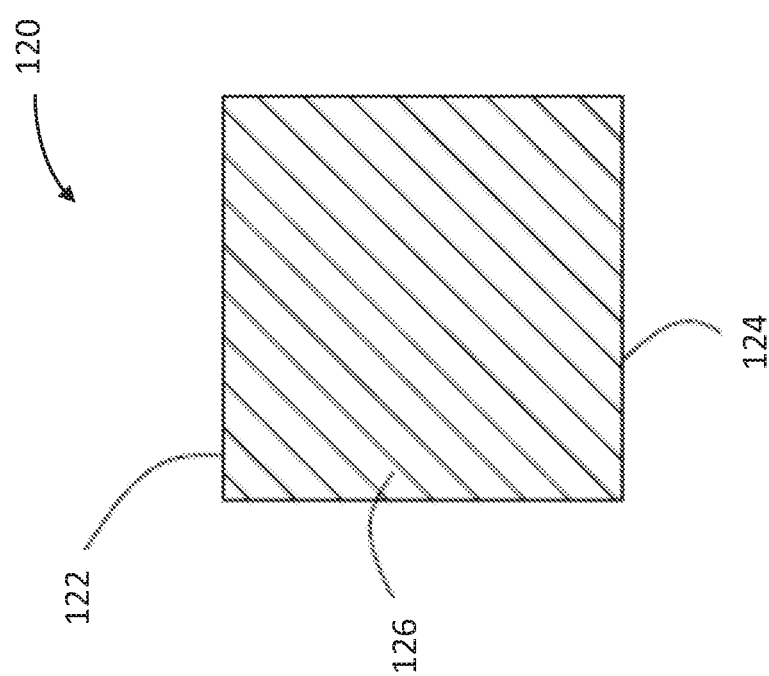

As previously mentioned, the flexible member 106 can be wound around a portion of the first member 102, second member 104, or both. This portion, which may be referred to herein as a "winding portion," can be have any geometry suitable for engaging the flexible member 106. FIG. 1B illustrates a cross-sectional view of a winding portion 120 suitable for use with the rotary electromechanical couplings described herein, in accordance with embodiments. The winding portion 120 can include an upper surface 122, a lower surface 124 opposite the upper surface 122, and a lateral wall 126 connecting the upper and lower surfaces 122, 124. A flexible member can be wound around one or more exterior surfaces of the winding portion 120, such as around the upper surface 122, lower surface 124, and/or lateral wall 126. The geometry of the winding portion 120, as with any of the winding portions described herein, can be selected to accommodate the properties of the flexible member. For example, the perimeter of the winding portion 120 can be selected based on a minimum bending radius of the flexible member. The minimum bending radius may be the minimum radius to which the flexible member can be bent without damaging or destroying the flexible member, and may be influenced by the material properties (e.g., stiffness) of the flexible member.

FIG. 1C illustrates a cross-sectional view of a winding portion 130, in accordance with embodiments. The winding portion 130 can have an upper surface 132, lower surface 134 opposite the upper surface 132, and a lateral wall 136 connecting the upper and lower surfaces 132, 134. The lateral wall 136 can be shaped to define a cavity 138 extending from the upper surface 132 towards the lower surface 134. The cavity 138 may or may not be connected to the lower surface 134. A flexible member can be wound around the winding portion 130 such that a length of the flexible member is received within the cavity 138. In some instances, the motion of the flexible member can be constrained to within the cavity 138, so as to limit the overall amount of space occupied by the winding portion 130 and the flexible member.

Figure 1D:
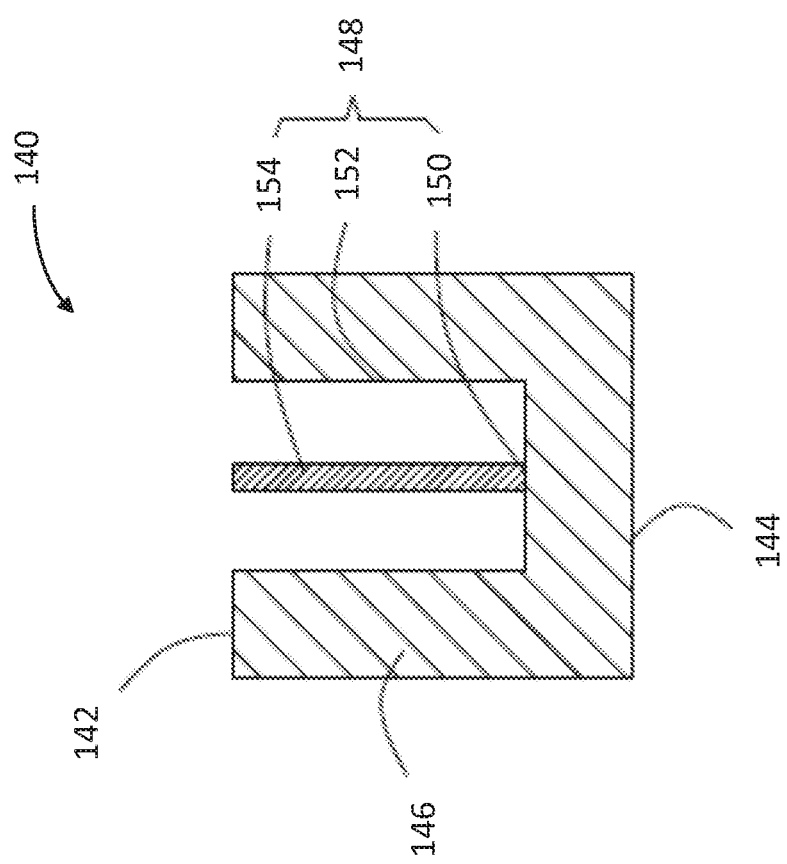
Figure 2:
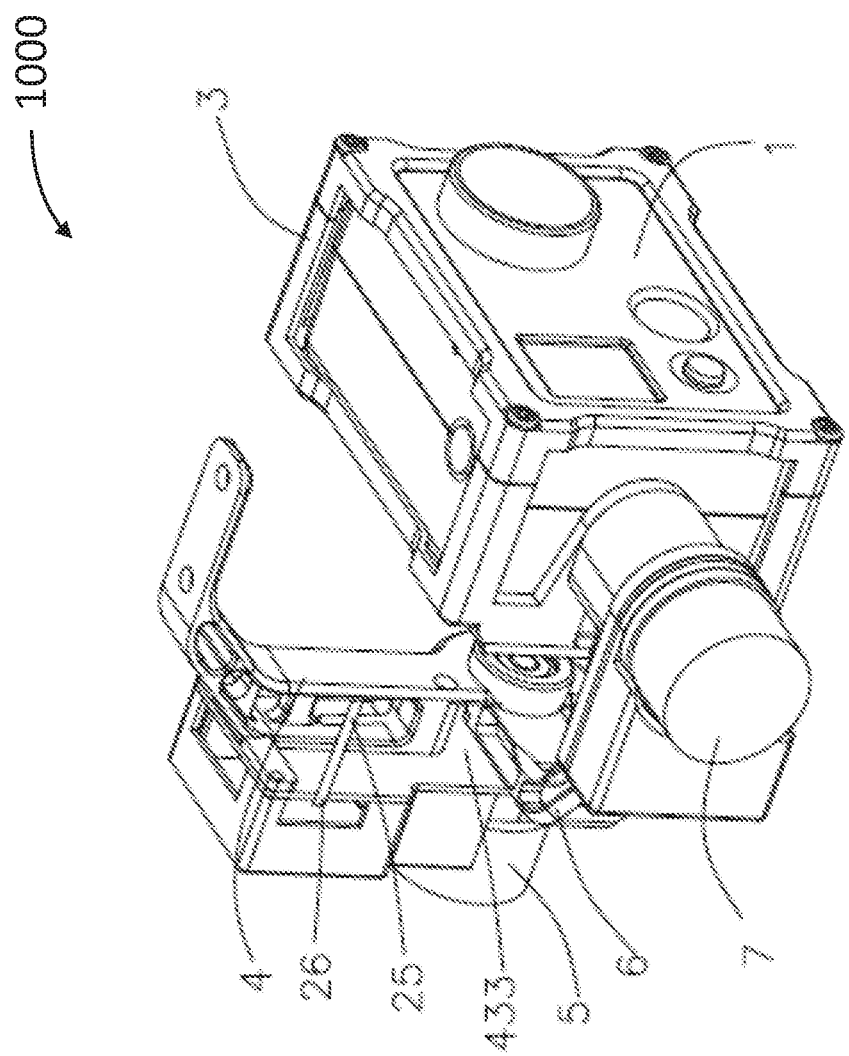
FIG. 2 illustrates a mounting platform for supporting a payload, in accordance with embodiments.
Figure 3:
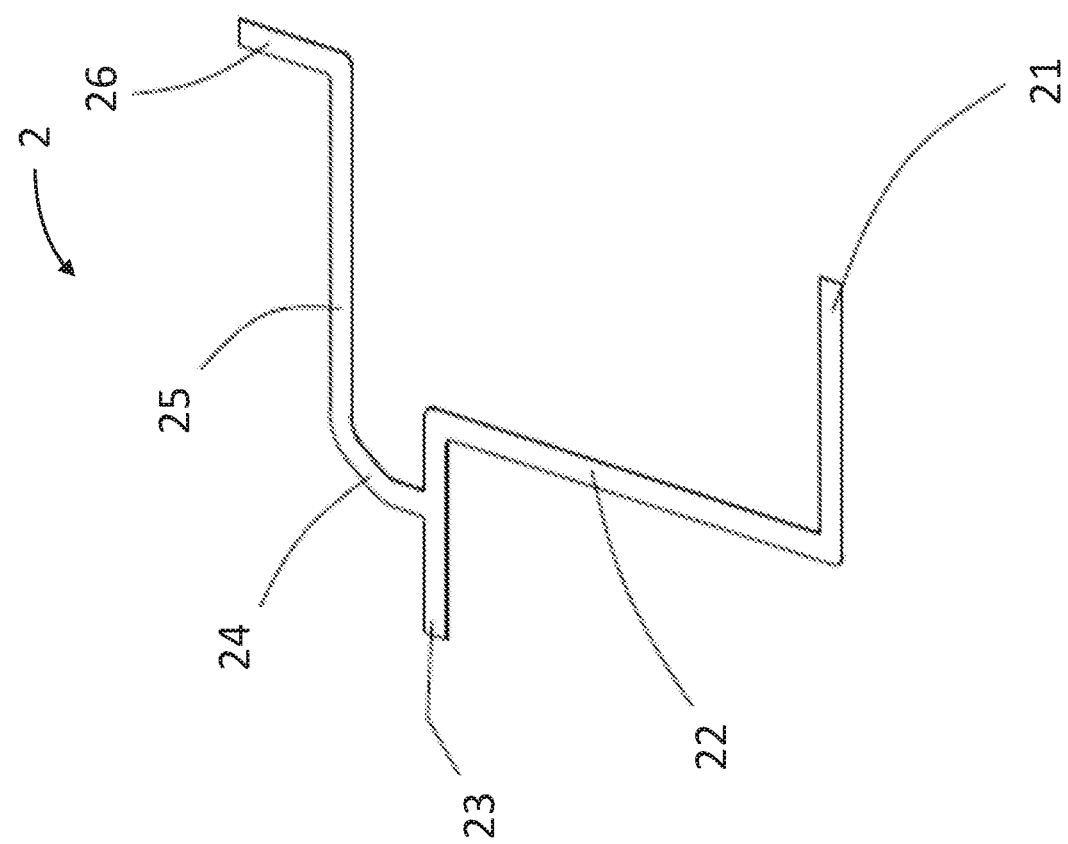
FIG. 3 illustrates a flexible member of a mounting platform, in accordance with embodiments.

FIG. 1D illustrates a cross-sectional view of a winding portion 140, in accordance with embodiments. Similar to the winding portion 130, the winding portion 140 can include an upper surface 142, lower surface 144, lateral wall 146, and cavity 148. The cavity 148 can include a bottom portion 150 adjacent the lower surface 144, and a wall 152 extending from the bottom portion 150 towards the upper surface 142. A shaft 154 can be disposed within the cavity 148. For example, the shaft 154 can be coupled to the bottom portion 150 of the cavity 148 extending upwards, parallel or approximately parallel to the wall 152. A flexible member can be received within the cavity 148 and wound around the shaft 154. In some instances, the stiffness of the flexible member can be selected such that the flexible member contacts the wall 152 when wound around the shaft 154. The motion of the flexible member can be constrained by the bottom portion 150, wall 152, and shaft 154 of the cavity 148. This design can be used to reduce the amount of space occupied by the winding portion 140 and flexible member, thereby enabling more compact rotary couplings.

The electromechanical rotary couplings described herein can be used to transmit electrical signals (e.g., power signals, control signals, data) across a rotary interface in which at least one component is rotating relative to another component. In contrast to conventional electromechanical rotary couplings, such as slip rings, the couplings described herein can be small, compact, and simple to implement, thereby reducing the size and cost of such couplings. Furthermore, as previously mentioned, the pre-wound arrangement of the flexible member of these electromechanical rotary couplings may prevent entanglement, thereby ensuring smooth operation of the rotary coupling during repeated rotational maneuvers.

FIGS. 2-10 illustrate a mounting platform 1000 for supporting a payload 1, in accordance with embodiments. Although the payload 1 is depicted as a camera, the mounting platform 1000 can be used to support any suitable payload, and any description herein relating to cameras or imaging devices can be applied to other types of payloads, and vice-versa. The payload 1 can be mechanically coupled by a payload mount 3. The payload mount 3 can be rotatably coupled to a first support member 6, and the first support member 6 can be rotatably coupled to a second support member 4 (see, e.g., FIG. 2). The second support member 4 can be coupled to a movable object (not shown), such as a UAV. The first support member 6, second support member 4, and payload mount 3 can be coupled in any sequence and configuration. For instance, a proximal portion of the payload mount 3 can be coupled to a distal portion of the first support member 6, a proximal portion of the first support member 6 can be coupled to a distal portion of the second support member 4, and a proximal portion of the second support member 4 can be coupled to the movable object. "Proximal" and "distal" may be used herein to refer to portions of the mounting platform 1000 closer to and farther from the movable object, respectively.

The first support member 6 can rotate the payload mount 3 and payload 1 relative to the first support member 6. The second support member 4 can rotate the first support member 6, payload mount 3, and payload 1 relative to the second support member 4. The rotation may occur along a clockwise direction and/or counterclockwise direction. In some instances, the first support member 6 and the second support member 4 can produce rotation of the payload 1 about first and second rotational axes, respectively. The first and second rotational axes may be different axes, such as intersecting axes. The axes may be orthogonal or approximately orthogonal to each other. Alternatively, the axes may be non-orthogonal. In some embodiments, the first and second rotational axes can be selected from two of the following: a roll axis, a pitch axis, or a yaw axis. The roll axis, pitch axis, and yaw axis may refer to rotational axes of the payload 1 relative to the movable object.

The support members 4, 6 can produce rotation of the payload 1 about the rotational axes using a suitable actuation mechanism. For example, the first support member 6 can include a first actuation unit 7 operable to rotate the payload mount 3 and payload 1 relative to the first support member 6, and the second support member 4 can include a second actuation unit 5 operable to rotate the first support member 6, payload mount 3, and payload 1 relative to the second support member 4. Each actuation unit may include a motor and a driving module controlling the driving of the motor, as described in greater detail below. The actuation units 5, 7 can be controlled by a controller (not shown), which can be provided as part of or coupled to the mounting platform 1000. Alternatively, the controller can be provided separately from the mounting platform 1000, such as on a movable object carrying the mounting platform 1000. The controller may control the actuation units 5, 7 based on position and/or orientation feedback received from the actuation units 5, 7, payload mount 3, or payload 1, as described in further detail below. Additionally, the actuation units 5, 7 can be powered by a suitable power source (e.g., a battery) (not shown), which may be situated on the mounting platform 1000 or provided on a movable object coupled to the mounting 1000. In some embodiments, the power source may be the same as the power source used to power one or more components of the movable object (e.g., propulsion system, navigation system).

The mounting platform 1000 can include a flexible member 2 (depicted in FIG. 3) for communicating electrical signals, including control signals, power, and/or data (e.g., feedback data, payload data). As previously discussed, the flexible member 2 may be a flexible circuit board, electrical wire, flat cable, or any other flexible electrical connector. The flexible member 2 may transmit electrical signals between one or more components of the mounting platform 1000 and the movable object. Alternatively, the flexible member 2 can be used to transmit electrical signals between one or more components of the mounting platform 1000, and other connectors can be used to electrically couple the flexible member 2 to the movable object. In some embodiments, the flexible member 2 can electrically couple the first support member 6 (e.g., via the first actuation unit 7), second support member 4 (e.g., via the second actuation unit 5), and payload mount 3. In some instances, the payload mount 3 can be electrically coupled to the payload 1, such that the flexible member 2 is in electrical communication with the payload 1 via the payload mount 3. Alternatively, the payload mount 3 may not be electrically coupled to the payload 1.

The geometry of the flexible member 2 can be adapted as necessary to provide the desired connectivity. For example, the flexible member 2 can include any suitable combination of linear and nonlinear portions. The ends of the flexible member 2 can connect to various components of the mounting platform 1000 and/or movable object as previously described herein. In some instances, the flexible member 2 can be branched so as to provide multiple ends (e.g., two, three, four, five, or more), each end used to couple to a respective component. For instance, a first end 21 may connect to the payload mount 3, a second end 23 may connect to the first actuation unit 7, and a third end 26 may connect to the second actuation unit 5. One or more lengths of the flexible member 2 can be wound around a portion of the mounting platform, such that the length winds or unwinds along with the rotation of various components of the platform, similar to the electromechanical rotary couplings previously described herein. In some instances, a first length 22 may wind around a portion of the payload mount 3 or first support member 6, and a second length 25 may wind around a portion of the first support member 6 or the second support member 4. For example, the first length 22 may wind around a proximal portion of the payload mount 3 or a distal portion of the first support member 6, and the second length 25 may wind around a proximal portion of the first support member 6 or a distal portion of the second support member 4. Advantageously, the winding configuration of the flexible member 2 can be used to maintain electrical connectivity between rotating components of the mounting platform 1000 without the risk of entanglement.

Figure 4:
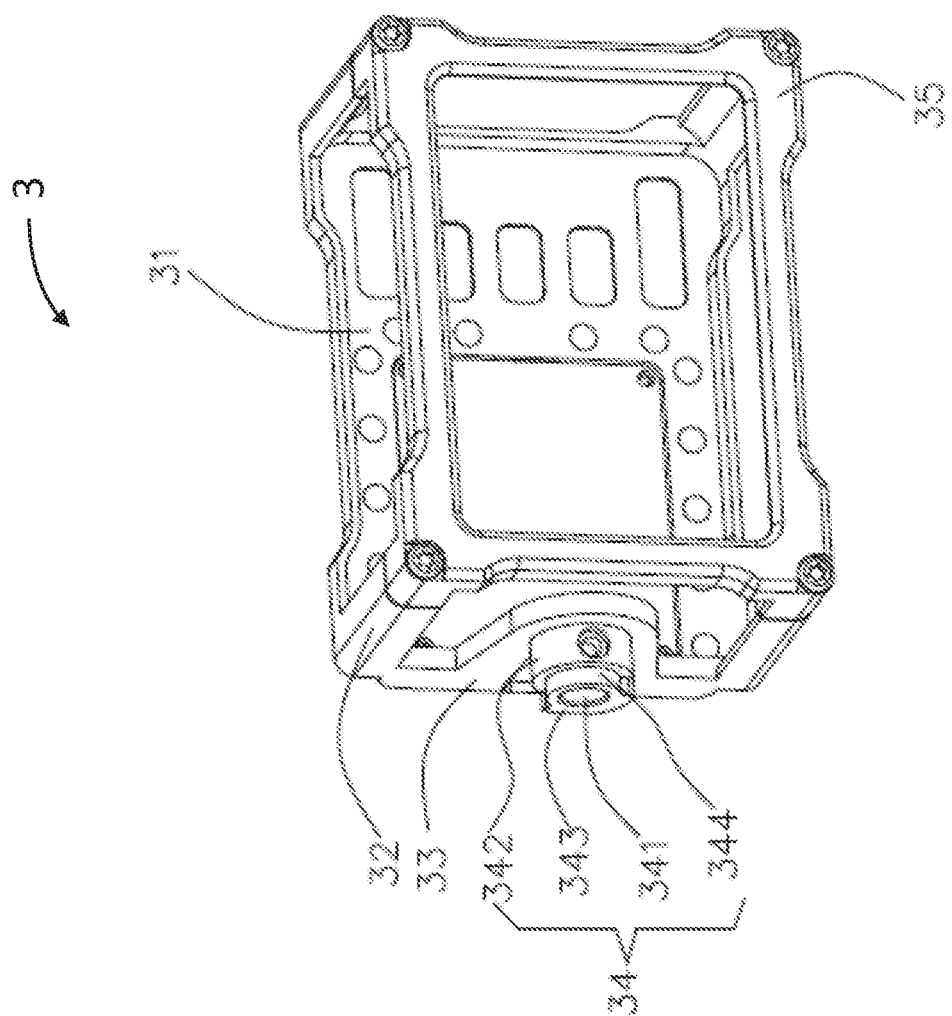
FIG. 4 illustrates a payload mount of a mounting platform, in accordance with embodiments.

The components of the mounting platform 1000 described herein can have any suitable design and structure. FIG. 4 illustrates the payload mount 3 of the mounting platform 1000, in accordance with embodiments. The payload mount 3 can be used to secure a payload 1, as previously mentioned. For example, the payload mount 3 can restrict the motion of the payload 1 (with respect to up to six degrees of freedom) so as to prevent undesired movements of the payload 1 during operation of the mounting platform 1000 and/or movable object, as well as to prevent inadvertent loosening of the payload 1 that may result in loss of or damage to the payload 1. Optionally, a payload mount 3 may include components protecting the payload 1 from the environment, such as shields, covers, waterproofing elements, and the like.

The payload mount 3 can include a base plate 31 and a plurality of holding plates 32. The holding plates 32 can extend from opposing sides of the base plate 31. A cover plate 35 can be coupled to the holding plates 32, such as by screws or other fasteners. The payload mount 3 can also include an attachment plate 33 extending from the base plate 31 and situated between two adjacent holding plates 32. An attachment shaft 34 can extend outward from the attachment plate 33 to engage the first actuation unit 7 of the first support member 6, as described below. The attachment shaft 34 can include an inner ring 341, an outer ring 342 separated from the inner ring 341 by a specified distance, an extension 343 connecting the inner ring 341 to the outer ring 342, and a limiting groove 344 recessed from the outer ring 342 towards the inner ring 341.

In some embodiments, the cover plate 35 can be releasably coupled to the holding plates 32 so as to enable the payload 1 to be releasably mounted into the payload mount 3. When mounted, the payload 1 can be secured between the base plate 31, holding plates 32, attachment plate 34, and cover plate 35. In some embodiments, the base plate 31, holding plates 32, attachment plate 34, and/or cover plate 35 may include apertures or windows enabling the payload to access the surrounding environment. For example, the apertures can be sized to maximize the available unobstructed field of view of an imaging device carried by the payload mount 3.

Additionally, the payload mount 3 can include a detection module (not shown) capable of detecting a spatial disposition of the payload 1. The detection module can include position and/or orientation sensors, such as accelerometers and/or gyroscopes, which may be provided as part of an inertial measurement unit (IMU). The sensors can provide position and/or orientation data that may be transmitted to a controller on the mounting platform 1 or movable object, such as for feedback-based control, as described below. The sensor data can be transmitted from the payload mount 3 to the flexible member 2 via a suitable electrical interface (e.g., a PCB coupled to the base plate 31). Optionally, the detection module may be situated directly on the payload 1 rather than on the payload mount 3. In such instances, the payload 1 can be electrically coupled to the payload mount 3 so as to enable transmission of the sensor data to the controller via the flexible member 2, or may include other communication mechanisms (e.g., wireless communication) that enable transmission of the sensor data independently of the flexible member 2.

Figure 5:
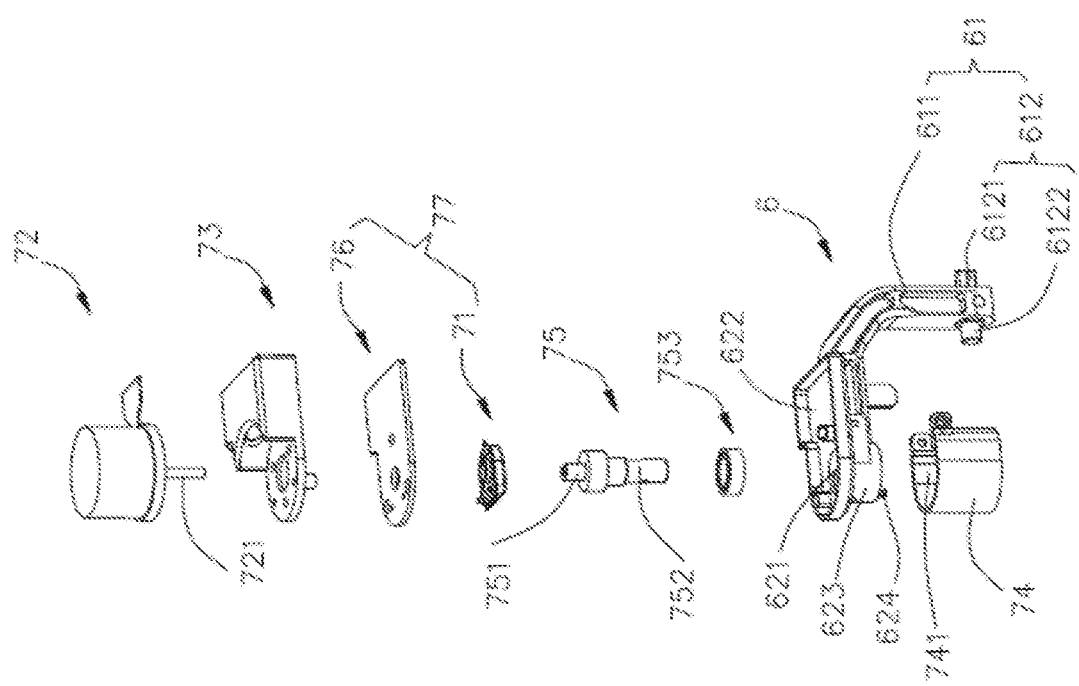
FIG. 5 illustrates an exploded view of a first support member of a mounting platform, in accordance with many embodiments.

FIG. 5 illustrates an exploded view of the first support member 6 of the mounting platform 1000, in accordance with embodiments. The first support member 6 may couple to and rotate the payload mount 3, thereby rotating the payload 1 about a first rotational axis. The first support member 6 can include a rotation arm 61 and a holding arm 62 extending from the rotation arm 61 at an angle to form a bend in the support member 6 (see also FIG. 8). The rotation arm 61 can include a rotation rod 611 and a first arm shaft 612 passing through the rotation rod 611. The first arm shaft 612 can include a first arm rotation shaft 6121 situated on one side of the rotation rod 611 and a second arm rotation shaft 6122 situated on the other side of the rotation rod 611. The holding arm 62 can include an arm portion 622, an insertion hole 621 extending through the arm portion 622, a winding portion 623 extending outwards from the arm portion 622, and a blocking portion 624 extending outwards from the winding portion 623 in a direction away from the arm portion 622.

As previously mentioned, the first support member 6 can include a first actuation unit 7 operable to rotate the payload mount 3 relative to the first support member 6. The first actuation unit 7 can be coupled to the holding arm 62, such that a portion of the first actuation unit 7 is received within the insertion hole 621 of the holding arm 62. The first actuation unit 7 can include a first driving motor 72, first driving motor outer cover 73, support housing 74, a second arm shaft 75, and a first driving module 77. The first driving motor 72 can be coupled onto the first driving motor outer cover 73. The first driving motor 72 can include a stator (not shown), a rotor (not shown) rotatable relative to the stator, a first rotation shaft 721, and a rotation bearing (not shown) fixed to the first rotation shaft 721. The first actuation unit 7 can also include a support housing 74, which may be affixed to the side of the holding arm 62 opposite the first driving motor 72. The second arm shaft 75 can be disposed around the first rotation shaft 721, and can include a third arm rotation shaft 751 rotatably coupled to the first rotation shaft 721. The second arm shaft 75 can also include a fourth arm rotation shaft 752 inserted within the receiving cavity 741, and a first support bearing 753 disposed around the fourth arm rotation shaft 752 and received in the winding portion 623 of the holding arm 62. Alternatively, the first support bearing 753 can be received in both the insertion hole 621 and the winding portion 623, or received only within the insertion hole 621. In some instances, the first support bearing 753 can be replaced with a shaft sleeve.

A first driving module 77 can be used to control the driving of the first driving motor 72. The first driving module 77 can include a first motor driver 76 and a first potentiometer 71 situated on the first motor driver 76. The first potentiometer 71 can be inserted in the first rotation shaft 721 so as to measure the relative position of the rotor and stator of the first driving motor 72, thereby generating a first position signal. The first position signal can be received by the first motor driver 76 and transmitted to a controller, as described in further detail below. The motor driver 76 can include hardware and/or software components suitable for controlling the driving of the first driving motor 72 and receiving position signals from the first potentiometer 71, such as components implemented on a PCB.

Figure 6:
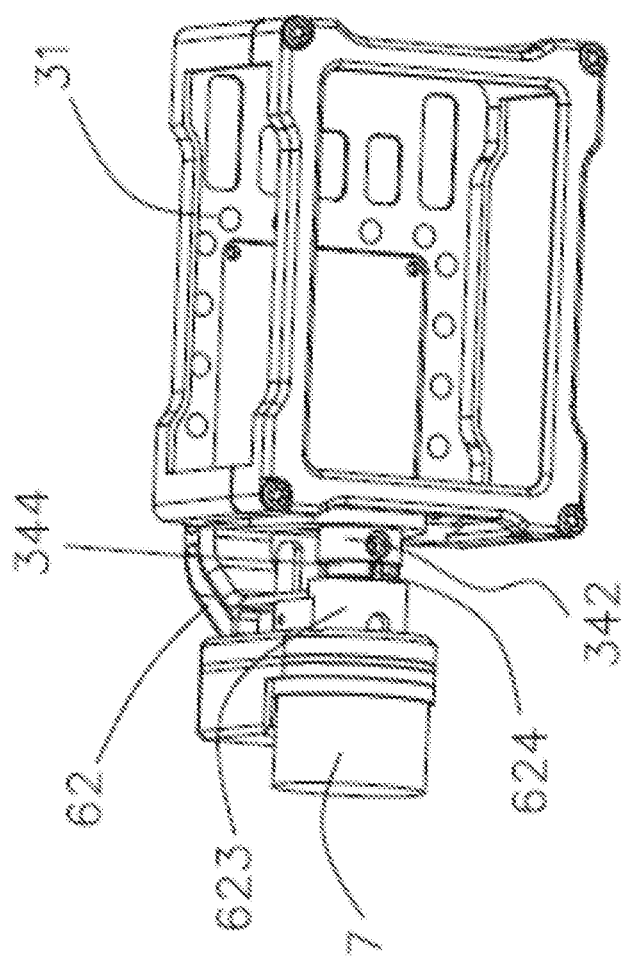
FIG. 6 illustrates a payload mount coupled to a first support member, in accordance with many embodiments.

FIG. 6 illustrates the payload mount 3 coupled to the first support member 6, in accordance with many embodiments. The second arm shaft 75 of the first actuation unit 7 of the support member 6 can be received within the inner ring 341 of the attachment shaft 34 so as to rotatably couple the fourth arm rotation shaft 752 to the attachment shaft 34 (see also FIGS. 4, 5). When the driving motor 72 of the first actuation unit 7 is driven, the first rotation shaft 721 can rotate, thereby rotating the attachment shaft 34 of the payload mount 3 via rotation of the second arm shaft 75. Accordingly, the payload mount 3 can be driven by the first rotation shaft 721 to rotate forward and/or backwards relative to the first support member 6.

Figure 7:
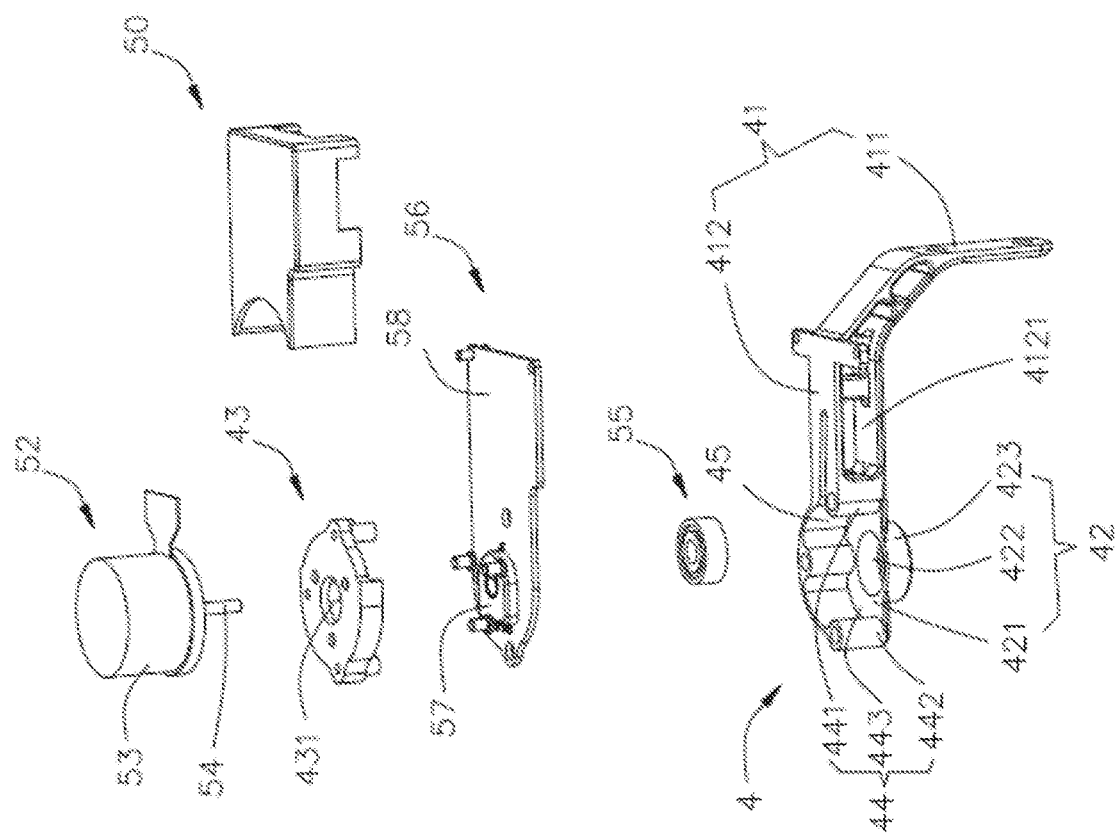
FIG. 7 illustrates an exploded view of a second support member of a mounting platform, in accordance with many embodiments.

FIG. 7 illustrates an exploded view of the second support member 4 of the mounting platform 1000, in accordance with embodiments. The second support member 4 may couple to and rotate the first support member 6, thereby rotating the payload 1 about a second rotational axis. The second support member 4 can include a holding arm 41. The holding arm 41 can include a horizontal arm 411 and a vertical arm 412 extending from the horizontal arm 411 at an angle to form a bend in the second support member 4. The horizontal and vertical arms 411, 412 can be integrally formed. Alternatively, the horizontal and vertical arms 411, 412 can be provided separately and coupled to each other. The vertical arm 412 can include a cavity 4121 shaped to permit passage of the flexible member 2, as described below. A first fixing portion 43 and a second fixing portion 42 can be connected to the holding arm 41 at the end of the vertical arm 412 away from the horizontal arm 411. The first fixing portion 43 and second fixing portion 42 can be integrally formed with the holding arm 41. Alternatively, at least one of the first fixing portion 43 and second fixing portion 42 can be provided separately from and coupled to the holding arm 41. In some embodiments, the second fixing portion 42 is integrally formed with the holding arm 41, and the first fixing portion 43 is releasably coupled to the holding arm 41 using one or more fasteners.

The first fixing portion 43 and second fixing portion 42 can be disposed on the holding arm 41 opposite of each other and separated by a specified distance. A connecting wall 44 can connect the first fixing portion 43 to the second fixing portion 42, such that a receiving space 45 is formed within the first fixing portion 43, second fixing portion 42, and connecting wall 44. The first fixing portion 43 can include a first aperture 431. The second fixing portion 42 can include a bottom plate 421, a second aperture 422 running through the bottom plate 421, and a surrounding portion 423 surrounding the second aperture 422 and extending outward from the bottom plate 421 away from the connecting wall 44. The connecting wall 44 can include a first stop 441, a second stop 442 opposite the first stop 441, and an opening 443 formed between the first and second stops 441, 442 and in communication with the receiving space 45.

The second support member 4 can include a second actuation unit 5 used to rotate the first support member 6 relative to the second support member 4, as previously discussed. The second actuation unit 5 can include a second driving motor 52 and a second driving motor cover 50. The second driving motor 52 can include a casing 53, a stator (not shown), a rotor (not shown) rotatable relative to the stator, a second rotation shaft 54 coupled to the rotor and extending partially out of the casing 53, and a rotation bearing (not shown) received within the casing 53 and situated around the second rotation shaft 54. The second actuation unit 5 can further include a second support bearing 55 situated around the second rotation shaft 54 and extending out of the casing 53. In some instances, the second support bearing 55 can be replaced with a shaft sleeve.

The second actuation unit 5 can be coupled to the first fixing portion 43 of the second support member 4. The second rotation shaft 54 of the second driving motor 52 can be received within the first aperture 431 and second aperture 422. The second support bearing 55 can be received within the second aperture 422 and surrounding portion 423. Alternatively, the second support bearing 55 can be received within only the second aperture 422, provided that the bottom plate 421 is of sufficient thickness. When assembled, the geometric center of the second aperture 422 and the center of rotation of the second support bearing 55 can be aligned with the axis of the second rotation shaft 54.

A second driving module 56 can be used to control the driving of the second driving motor 52. The second driving module 56 can include a second motor driver 58 and a second potentiometer 57 situated on the second motor driver 58. The second potentiometer 57 can be inserted in the second rotation shaft 54 so as to measure the relative position of the rotor and stator of the second driving motor 52, thereby generating a second position signal. The second position signal can be received by the second motor driver 58 and transmitted to a controller, as described in further detail below. The motor driver 58 can include software and/or hardware components suitable for controlling the driving of the second driving motor 52 and receiving data from the second potentiometer 57, such as components implemented on a PCB.

Figure 8:
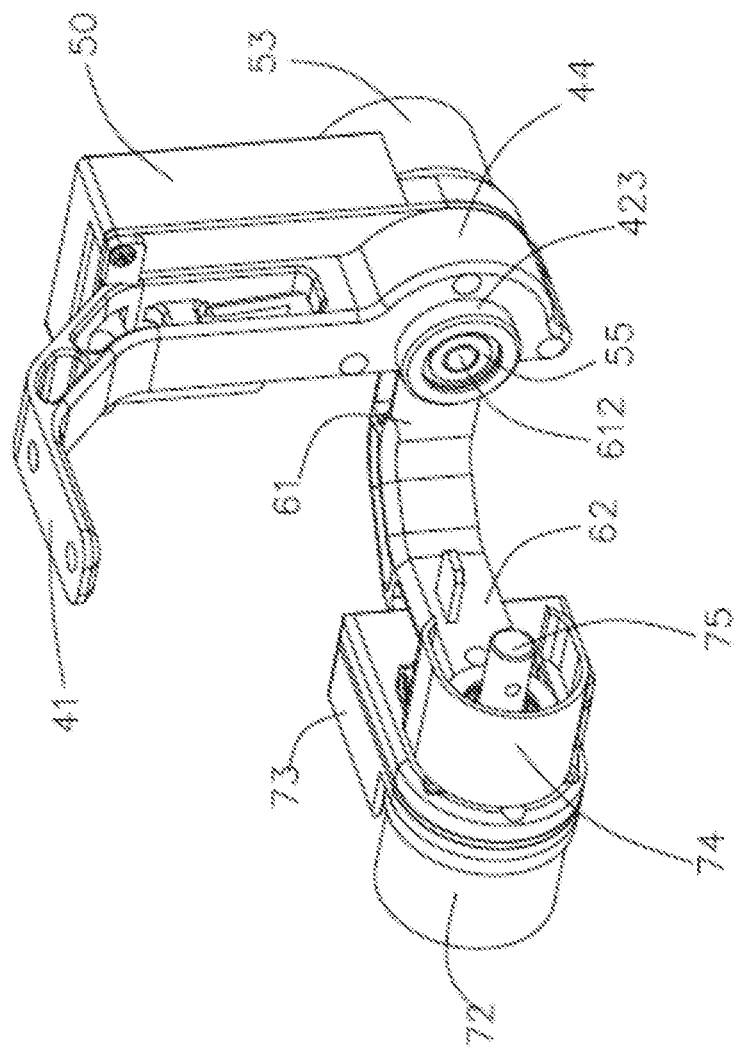
FIG. 8 illustrates a first support member coupled to a second support member, in accordance with many embodiments.

FIG. 8 illustrates the first support member 6 coupled to the second support member 4, in accordance with embodiments. A portion of the first support member 6 can be received within the receiving space 45 of the second support member 4 via the opening 443 (see also FIGS. 5, 7). For example, the first arm rotation shaft 6121 of rotation arm 61 can be situated within the receiving space 45, around the second rotation shaft 54 of the second actuation unit 5. The second arm rotation shaft 6122 can be inserted in the second support bearing 55. Accordingly, the second support bearing 55 can be rotatably coupled to the second rotation shaft 54 via the second arm rotation shaft 6122 of the first arm shaft 612. The second driving motor 52 can be driven to rotate the second rotation shaft 54, thereby driving the first support member 6 to rotate up and down relative to the vertical arm 412 of the second support member 4. The second support bearing 55 and the rotation bearing of the driving motor 52 can be used together to prevent axial deviation of the second rotation shaft 54 and the first arm shaft 612, thereby improving the stable transfer of power from the second rotation shaft 54 to the first support member 6. Alternatively, in some embodiments, the first arm shaft 612 may be optional. For instance, the second rotation shaft 54 can be inserted within the rotation rod 611, with the second support bearing 55 provided directly around the second rotation shaft 54.

Referring again to FIG. 2, the payload mount 3, first support member 6, and second support member 4 can be electrically coupled by the flexible member 2, as discussed above. The flexible member 2 can include a first end 21 connected to a second end 23 via a first length 22. A connecting portion 24 can join the second end 23 to a second length 25, and the second length 25 can terminate in a third end 26. The first length 22 can be perpendicular to the first and second ends 21, 23, and the second length 25 can be perpendicular to the third end 26. The connecting portion 24 can be curved so as to approximately conform to the curvature of the first support member 6 (e.g., at the bend formed by the rotation arm 61 and holding arm 62).

Figure 9:
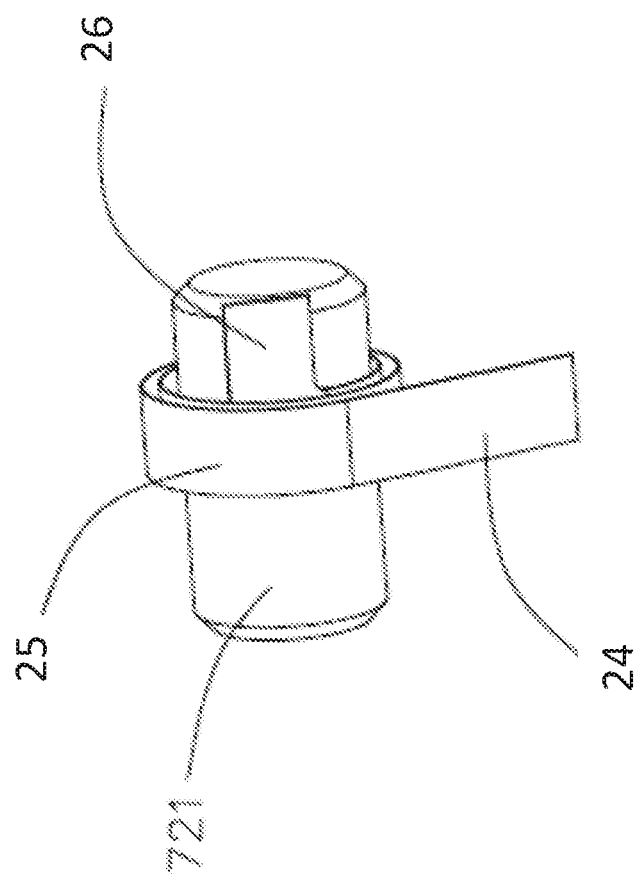
FIG. 9 illustrates a portion of the flexible member wound around the first rotation shaft.

When the mounting platform 1000 is assembled, the first end 21 can be coupled to the base plate 31 of the payload mount 3. The first length 22 can be wound around the winding portion 623 of the first support member 6 and/or the attachment shaft 34 of the payload mount 3, so as to wind or unwind according to the rotation of the payload mount 3 relative to the first support member 6. Alternatively, the winding portion 623 and attachment shaft 34 may be optional, so that the first length 22 is wound around the second arm shaft 75. In some instances, the second arm shaft 75 may also be optional, such that the first length 22 is wound directly around the first rotation shaft 721 (as depicted in FIG. 9).

The second end 23 can be coupled to the first driving module 77 (e.g., via the first motor driver 76) of the first support member 6. The connecting portion 24 can extend between the first actuation unit 7 and the proximal portion of the first support member 6. The second length 25 can be inserted into the receiving space 45 through the opening 433, such that a portion of the second length 25 is received between the rotation arm 61 and the connecting wall 44, and between the first fixing portion 43 and the second fixing portion 42. This portion of the second length 25 can be wound around the rotation arm 61 (e.g., the rotation rod 611) the of the first support member 6, so as to wind or unwind according to the rotation of the first support member 6 relative to the second support member 4. A remaining portion of the second length 411 can pass through the cavity 4121 and extend along the vertical arm 412. The third end 26 can be coupled to the second driving module 56 (e.g., via the second motor driver 58) of the second support member 4. In some instances, the second driving module 56 can be electrically coupled to onboard devices (e.g., power source, controller) of a movable object coupled to mounting platform 1000, thereby serving as an electrical interface between the flexible member 2 and the onboard devices.

In some embodiments, power can be transmitted to the various components of the mounting platform 1000 via the flexible member 2. For example, a power source carried by the movable object can be electrically coupled to the second actuation unit 5 (e.g., via the second driving module 56). The second actuation unit 5 can transmit power to the flexible member 2 via the third end 26 of the flexible member 2. Subsequently, power can be transmitted to the first actuation unit 7 (e.g., via the first driving module 77) through the second end 23 and to the payload mount 3 through the first end 21. Optionally, power may be also transmitted to the payload 1 via an electrical interface of the payload mount 3.

Similarly, a controller carried by the movable object can be electrically coupled to the second actuation unit 5. Control signals generated by the controller can be transmitted to the actuation unit 5, which in turn can transmit the control signals to the flexible member 2 via the third end 26. The flexible member 2 can propagate the control signals to the first actuation unit 7 via the second end 23, to the payload mount 3 via the first end 21, and optionally to the payload 1 via the payload mount 3. Conversely, data generated by the actuation units 5, 7 (e.g., position signals, as described below), payload mount 3 (e.g., position and/or orientation data, as described below), and/or payload 1 (e.g., position and/or orientation data, as described below, as well as payload data) can be transmitted back to the controller or other onboard device carried by the movable object. For instance, data can be transmitted from the first actuation unit 7 to the flexible member 2 via the second end 25 and from the payload mount 3 to the flexible member 2 via the first end 21. Optionally, data from the payload 1 can be transmitted to the flexible member 2 via the payload mount 3. The data can then be routed by the flexible member 2 to the second actuation unit 5 via the third end 26. Data from the second actuation unit 5 can be transmitted to the onboard devices via the electrical coupling between the second actuation unit 5 and the movable object.

The rotation of the components of the mounting platform 1000 can be constrained to a predetermined range, so as to prevent overextension and damage to the flexible member 2. For example, the rotation of the payload mount 3 relative to the first support member 6 and/or the rotation of the first support member 6 relative to the second support member 4 can be constrained. The extent of allowable rotation can be determined based on the size of the pre-wound lengths of the flexible member 2. Additionally, the rotation range can be determined based on the functionality of the payload 1. For example, a camera may require a larger rotation range in order to provide a panoramic field of view for aerial photography. The rotational constraints can be implemented using software (e.g., pre-programmed limits), hardware (e.g., physically preventing rotation, such as by stops), or suitable combinations thereof.

Figure 10A:
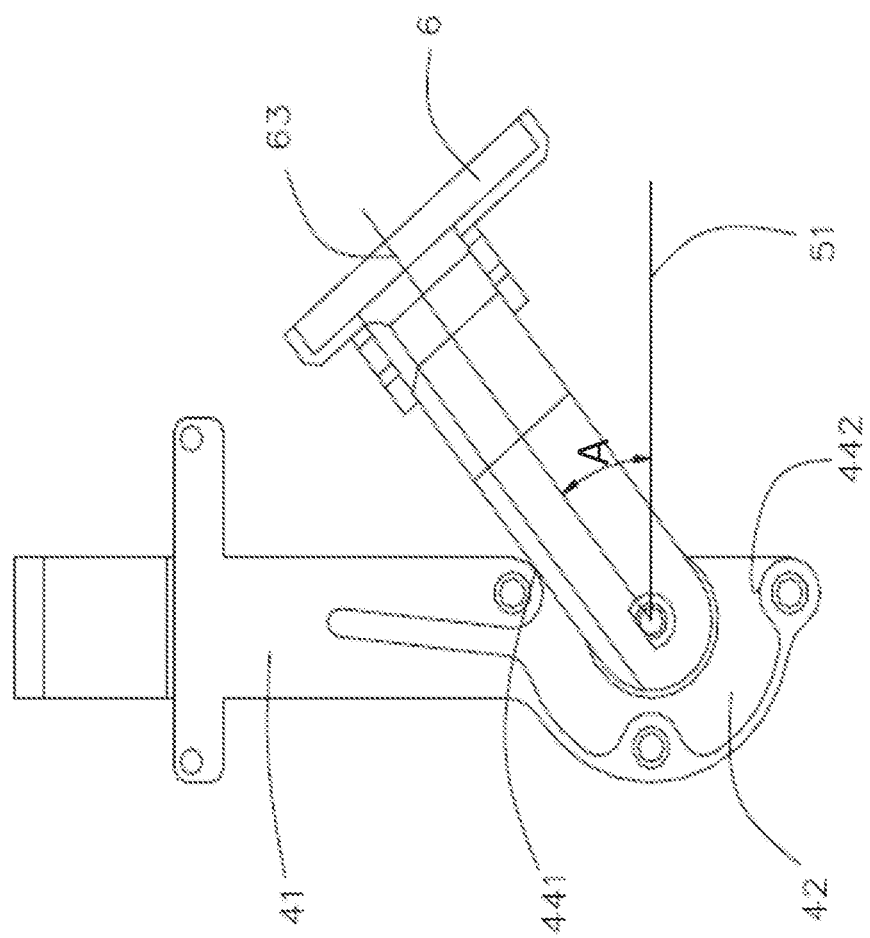
FIGS. 10A and 10B illustrate cross-sectional views of constrained rotation of a first support member, in accordance with many embodiments.
Figure 10B:
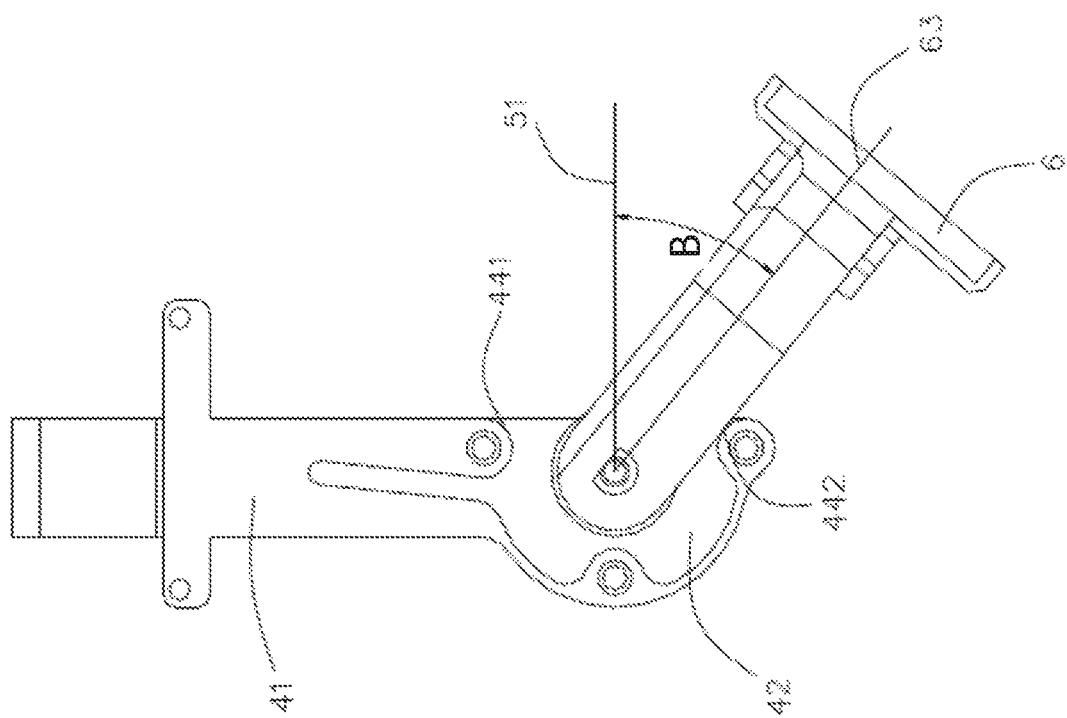

FIGS. 10A and 10B illustrate constrained rotation of the first support member 6, in accordance with embodiments. As previously mentioned, a proximal portion of the first support member 6 can be received within a distal portion of the second support member 4 via the opening 443 (see, e.g., FIG. 7). The opening 443 can be flanked by first and second stops 441, 442. The size and positioning of the stops 441, 442 and opening 443 can be selected so as to limit the rotation of the first support member 6 relative to the second support member 4. For example, the stops 441, 442 may contact the first support member 6 when it is rotated to a first maximum rotation angle A and a second maximum rotation angle B (as measured between a rotation axis 63 of the first support member 6 and the horizontal plane 51), respectively, thereby physically constraining the rotation of the first support member 6 to a range between the angles A, B. Accordingly, the maximum rotation angle A can define a maximum upward rotation angle for the first support member 6, and the maximum rotation angle B can define a maximum downward rotation angle for the first support member 6.

The angles A, B may have the same magnitude, or different magnitudes. For example, the angles A, B may both be 50 degrees. As another example, the first angle A may be 40 degrees, and the second angle B may be 110 degrees. At least one of the angles A, B may be greater than or equal to approximately 10 degrees, 20 degrees, 30 degrees, 40 degrees, 50 degrees, 60 degrees, 70 degrees, 80 degrees, 90 degrees, 100 degrees, 110 degrees, 120 degrees, 150 degrees, or 180 degrees. Conversely, at least one of the angles A, B, may be less than or equal to approximately 10 degrees, 20 degrees, 30 degrees, 40 degrees, 50 degrees, 60 degrees, 70 degrees, 80 degrees, 90 degrees, 100 degrees, 110 degrees, 120 degrees, 150 degrees, or 180 degrees. The total range of rotation may be greater than or equal to approximately 10 degrees, 30 degrees, 45 degrees, 60 degrees, 90 degrees, 120 degrees, 135 degrees, 150 degrees, 180 degrees, 270 degrees, or 360 degrees. Conversely, the total range of rotation may be less than or equal to approximately 10 degrees, 30 degrees, 45 degrees, 60 degrees, 90 degrees, 120 degrees, 135 degrees, 150 degrees, 180 degrees, 270 degrees, or 360 degrees.

Referring again to FIG. 4, the rotation of the payload mount 3 relative to the first support member 6 can also be constrained. As previously described, the attachment shaft 34 of the payload mount 3 can include a limiting groove 344. The support member 6 may include a constraining portion shaped to be complementary to the limiting groove 344, such that the constraining portion is at least partially received within the limiting groove 344 and is movable within the limiting groove 344. When the payload mount is rotated to a maximum rotation angle, the constraining portion may contact an end of the limiting groove 344, thereby physically preventing further rotation. Accordingly, the size of the limiting groove 344 and/or constraining portion may determine the maximum rotation angles of the payload mount 3. Alternatively, in some embodiments, a limiting groove can be provided on the first support member 6 and a complementary constraining portion can be provided on the payload mount 3.

Figure 11:
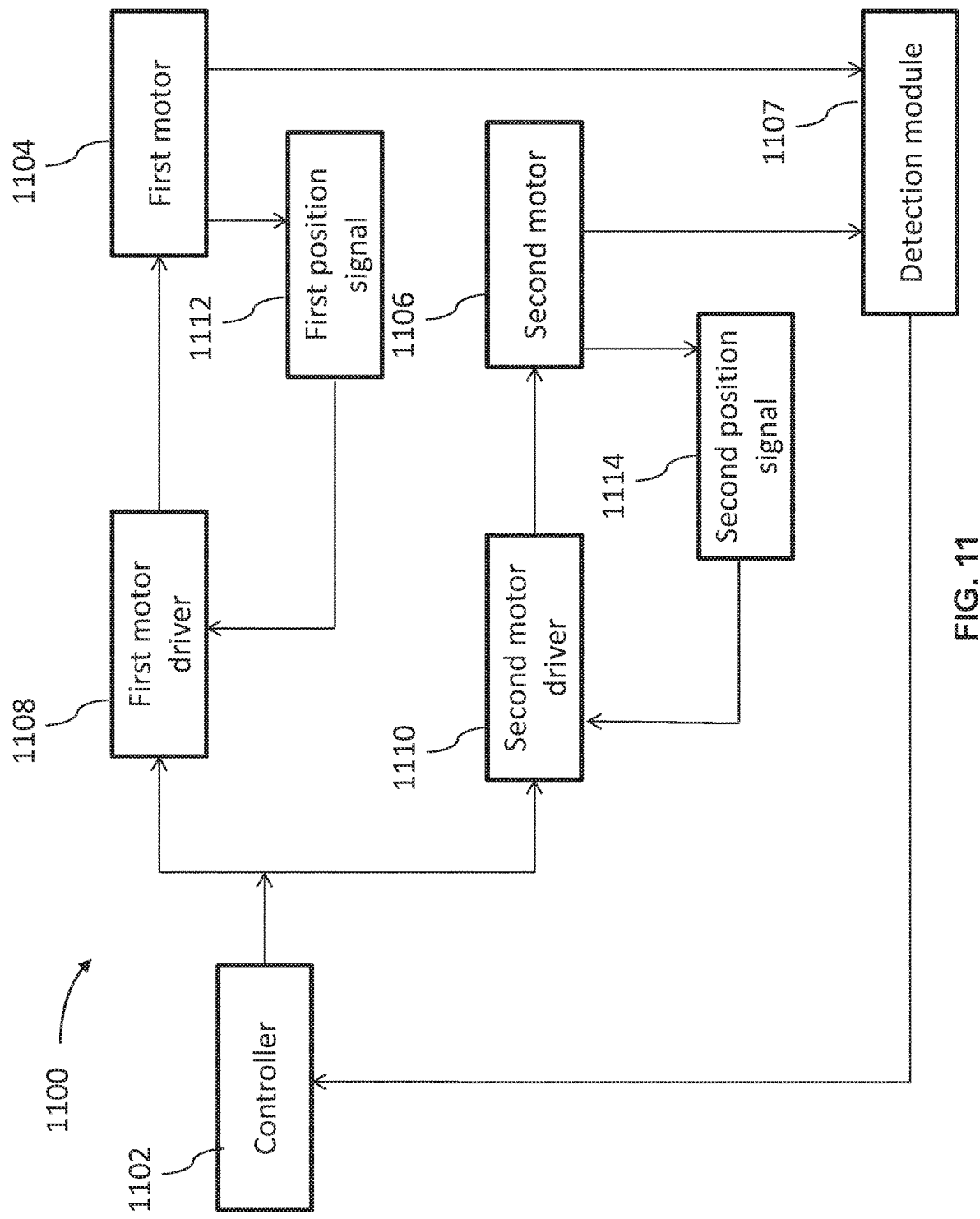
FIG. 11 is a schematic illustration of a control scheme for a mounting platform, in accordance with many embodiments.

FIG. 11 is a schematic illustration of a control scheme 1100 for a mounting platform, in accordance with embodiments. The control scheme 1100 can be implemented to control any embodiment of the mounting platforms described herein. In some instances, the control scheme 1100 can be used to control the driving of a plurality of motors (a "multi-motor" control scheme), such as two, three, four, five, or more motors. Some or all of the communication described herein with respect to the control scheme 1100 can be transmitted via a flexible member, such as the flexible member 2. A controller 1102, which may be situated on a mounting platform or on a movable object carrying the mounting platform, can generate control signals for driving a first motor 1104 (e.g., first driving motor 72) and/or a second motor 1106 (e.g., second driving motor 52). In some instances, the control signals can be generated based on data received from a detection module 1107 indicative of the spatial disposition of a mounted payload. The detection module 1107 may be situated on the payload or a payload mount carrying the payload, as previously described herein. The control signals produced by the controller 1102 can be received by a first motor driver 1108 (e.g., first motor driver 76) and/or a second motor driver 1110 (e.g., second motor driver 58). Based on the control signals, the first and second motor drivers 1108, 1110 may control the driving of the first and/or second motors 1104, 1106, for example, to effect a rotation of one or more components of a mounting platform, as previously described herein. The control signals can be transmitted simultaneously to the motor drivers 1108, 1110 to produce simultaneous driving of the motors 1104, 1106. Alternatively, the control signals can be transmitted sequentially, or to only one of the motor drivers 1108, 1110.

The first and second motor 1104, 1106 may be coupled to one or more sensors (e.g., first and second potentiometers 71, 57) configured to measure the driving of the motors. For example, a potentiometer can be inserted on a motor shaft of a motor so as to measure the relative position of a motor rotor and motor stator, thereby measuring the relative position of the rotor and stator and generating a position signal representative thereof. A first potentiometer can be used to generate a first position signal 1112 for the first motor 1104, and a second potentiometer can be used to generate a second position signal 1114 for the second motor 1106. The first and second position signals 1112, 1114 can be transmitted to the first and second motor drivers 1108, 1110, respectively, so as to provide feedback for controlling the driving of the first and second motors 1104, 1106, respectively. In some embodiments, the controller 1102 and/or the detection module 1107 may be optional, such that the first and second motor drivers 1108, 1110 are controlled independently. Advantageously, the control scheme 1100 can be used to provide feedback control for driving motors of a mounting platform, thereby enabling more precise and accurate rotation of the platform components.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be a living subject or be carried by a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of an movable object weight to a load weight may be greater than, less than, or equal to about 1:1. In some instances, a ratio of an movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 12:
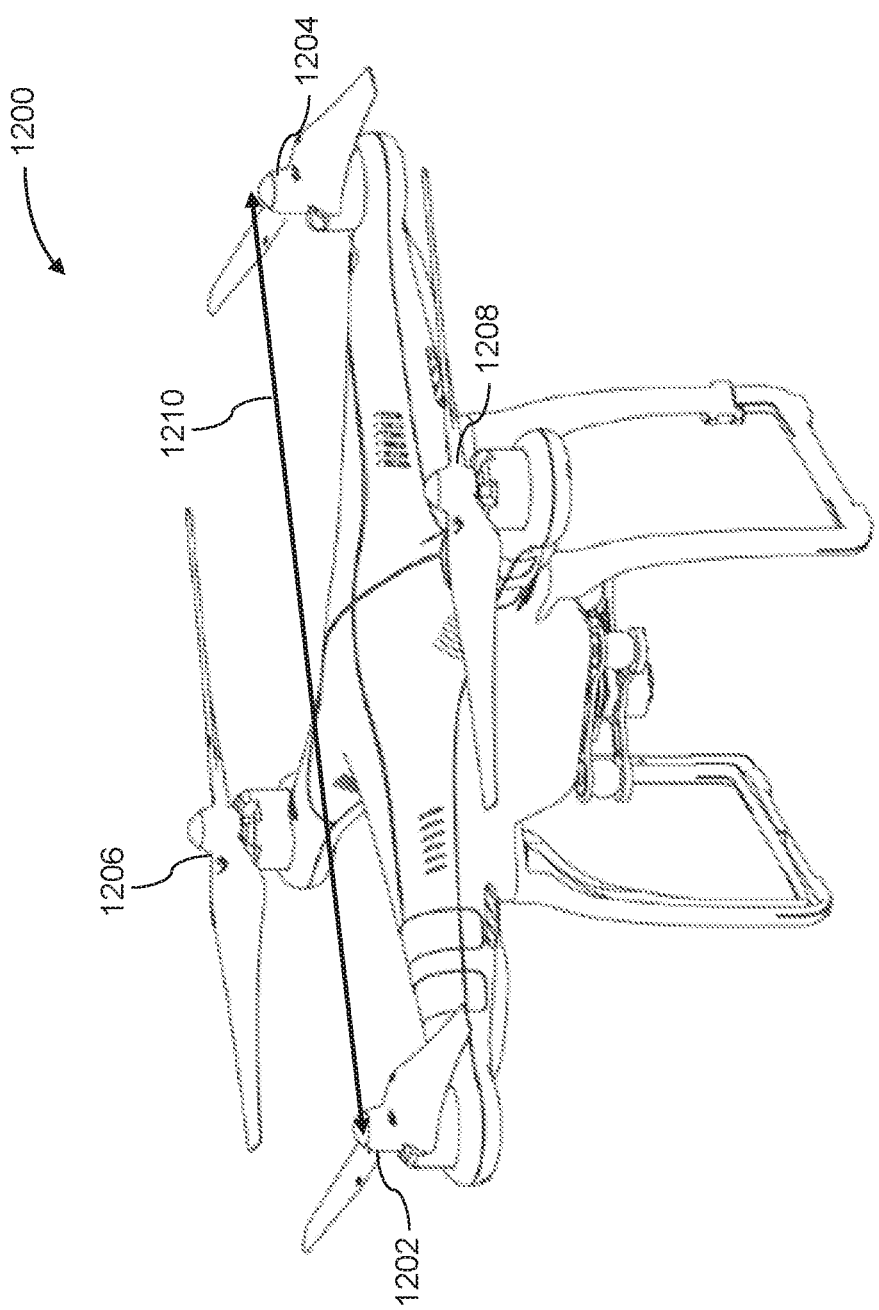
FIG. 12 illustrates an unmanned aerial vehicle, in accordance with embodiments.

FIG. 12 illustrates an unmanned aerial vehicle (UAV) 1200, in accordance with embodiments of the present disclosure. The UAV may be an example of a movable object as described herein. The UAV 1200 can include a propulsion system having four rotors 1202, 1204, 1206, and 1208. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1210. For example, the length 1210 can be less than or equal to 2 m, or less than equal to 12 m. In some embodiments, the length 1210 can be within a range from 40 cm to 7 m, from 70 cm to 2 m, or from 12 cm to 12 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 13:
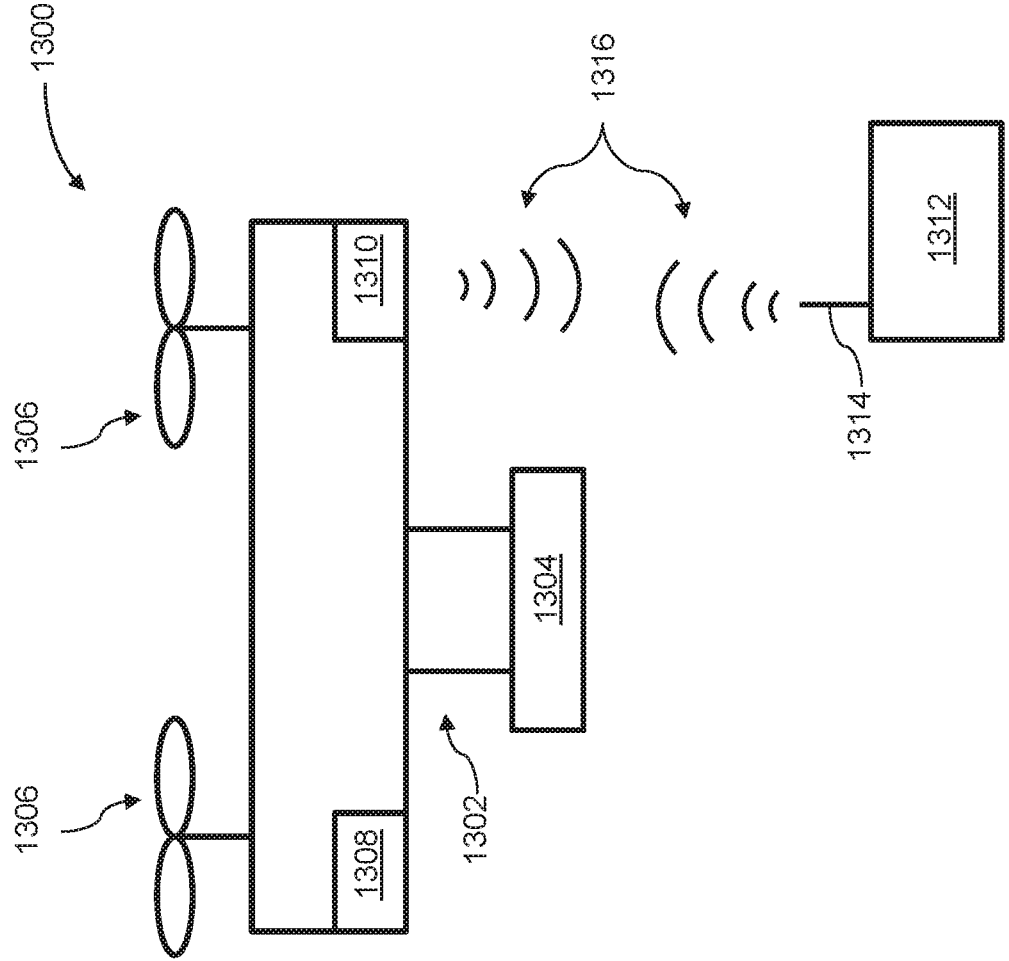
FIG. 13 illustrates a movable object including a carrier and a payload, in accordance with embodiments.

FIG. 13 illustrates a movable object 1300 including a carrier 1302 and a payload 1304, in accordance with embodiments. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1304 may be provided on the movable object 1300 without requiring the carrier 1302. The movable object 1300 may include propulsion mechanisms 1306, a sensing system 1308, and a communication system 1310.

The propulsion mechanisms 1306 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1306 can be mounted on the movable object 1300 using any suitable means, such as a support element (e.g., a drive shaft) as described elsewhere herein. The propulsion mechanisms 1306 can be mounted on any suitable portion of the movable object 1300, such on the top, bottom, front, back, sides, or suitable combinations thereof.

In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 1300 to hover in the air at a specified position and/or orientation. One or more of the propulsion mechanisms 1300 may be controlled independently of the other propulsion mechanisms. Alternatively, the propulsion mechanisms 1300 can be configured to be controlled simultaneously. For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1300. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1300 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like.

The communication system 1310 enables communication with terminal 1312 having a communication system 1314 via wireless signals 1316. The communication systems 1310, 1314 may include any number of transmitters, receivers, and/or transceivers suitable for wireless communication. The communication may be one-way communication, such that data can be transmitted in only one direction. For example, one-way communication may involve only the movable object 1300 transmitting data to the terminal 1312, or vice-versa. The data may be transmitted from one or more transmitters of the communication system 1310 to one or more receivers of the communication system 1312, or vice-versa. Alternatively, the communication may be two-way communication, such that data can be transmitted in both directions between the movable object 1300 and the terminal 1312. The two-way communication can involve transmitting data from one or more transmitters of the communication system 1310 to one or more receivers of the communication system 1314, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1306), or a movement of the payload with respect to the movable object (e.g., via control of the carrier 1302). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1308 or of the payload 1304). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1312 can be configured to control a state of one or more of the movable object 1300, carrier 1302, or payload 1304. Alternatively or in combination, the carrier 1302 and payload 1304 can also each include a communication module configured to communicate with terminal 1312, such that the terminal can communicate with and control each of the movable object 1300, carrier 1302, and payload 1304 independently.

In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other telecommunications network, such that data received from the movable object 1300 and/or terminal 1312 can be uploaded to a website or server.

Figure 14:
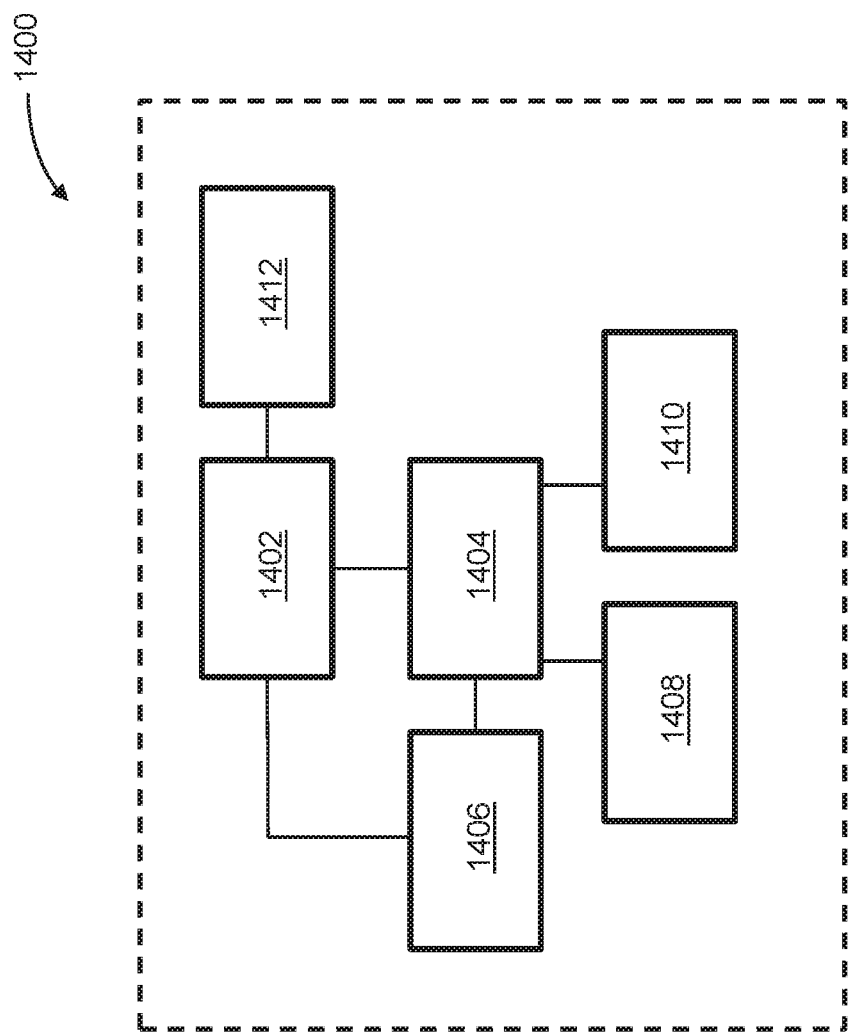
FIG. 14 is a schematic illustration by way of block diagram of a system for controlling a movable object, in accordance with embodiments.

FIG. 14 is a schematic illustration by way of block diagram of a system 1400 for controlling a movable object, in accordance with embodiments. The system 1400 can be used in combination with any suitable embodiment of the systems, devices, and methods disclosed herein. The system 1400 can include a sensing module 1402, processing unit 1404, non-transitory computer readable medium 1406, control module 1408, and communication module 1410.

The sensing module 1402 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1402 can be operatively coupled to a processing unit 1404 having a plurality of processors. In some embodiments, the sensing module can be operatively coupled to a transmission module 1412 (e.g., a Wi-Fi image transmission module) configured to directly transmit sensing data to a suitable external device or system. For example, the transmission module 1412 can be used to transmit images captured by a camera of the sensing module 1402 to a remote terminal.

The processing unit 1404 can have one or more processors, such as a programmable processor (e.g., a central processing unit (CPU)). The processing unit 1404 can be operatively coupled to a non-transitory computer readable medium 1406. The non-transitory computer readable medium 1406 can store logic, code, and/or program instructions executable by the processing unit 1404 for performing one or more steps. The non-transitory computer readable medium can include one or more memory units (e.g., removable media or external storage such as an SD card or random access memory (RAM)). In some embodiments, data from the sensing module 1402 can be directly conveyed to and stored within the memory units of the non-transitory computer readable medium 1406. The memory units of the non-transitory computer readable medium 1406 can store logic, code and/or program instructions executable by the processing unit 1404 to perform any suitable embodiment of the methods described herein. For example, the processing unit 1404 can be configured to execute instructions causing one or more processors of the processing unit 1404 to analyze sensing data produced by the sensing module. The memory units can store sensing data from the sensing module to be processed by the processing unit 1404. In some embodiments, the memory units of the non-transitory computer readable medium 1406 can be used to store the processing results produced by the processing unit 1404.

In some embodiments, the processing unit 1404 can be operatively coupled to a control module 1408 configured to control a state of the movable object. For example, the control module 1408 can be configured to control the propulsion mechanisms of the movable object to adjust the spatial disposition, velocity, and/or acceleration of the movable object with respect to six degrees of freedom. Alternatively or in combination, the control module 1408 can control one or more of a state of a carrier, payload, or sensing module.

The processing unit 1404 can be operatively coupled to a communication module 1410 configured to transmit and/or receive data from one or more external devices (e.g., a terminal, display device, or other remote controller). Any suitable means of communication can be used, such as wired communication or wireless communication. For example, the communication module 1410 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1410 can transmit and/or receive one or more of sensing data from the sensing module 1402, processing results produced by the processing unit 1404, predetermined control data, user commands from a terminal or remote controller, and the like.

The components of the system 1400 can be arranged in any suitable configuration. For example, one or more of the components of the system 1400 can be located on the movable object, carrier, payload, terminal, sensing system, or an additional external device in communication with one or more of the above. Additionally, although FIG. 14 depicts a single processing unit 1404 and a single non-transitory computer readable medium 1406, one of skill in the art would appreciate that this is not intended to be limiting, and that the system 1400 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1400 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An apparatus for supporting a payload, the apparatus comprising:
   a payload mount configured to be coupled to the payload to secure the payload;
   a first support member coupled to one side of the payload mount in a single arm configuration, wherein the first support member comprises a first actuation unit configured to rotate the payload mount around a first rotational axis relative to the first support member; and
   a single flexible member comprising a branched configuration, wherein the branched configuration includes at least a first end that is electrically coupled to the payload mount and a second end that is electrically coupled to the first actuation unit.

2. The apparatus of claim 1, wherein the single flexible member comprises a first connection portion connecting the first end and the second end, and wherein at least a portion of the first connection portion is configured to (i) wind around a portion of the payload mount or the first support member when the payload mount is rotated in a first direction around the first rotational axis, and (ii) unwind from the portion of the payload mount or the first support member when the payload mount is rotated in a second direction opposite the first direction around the first rotational axis.

3. The apparatus of claim 1, wherein the first support member comprises a winding portion including at least a cavity, wherein the cavity is configured to receive at least a portion of the single flexible member when the payload mount is rotated around the first rotational axis.

4. The apparatus of claim 3, wherein the winding portion further comprises a shaft disposed within the cavity, and wherein the single flexible member is configured to wind and unwind around the shaft when the payload mount is rotated around the first rotational axis.

5. The apparatus of claim 1, further comprising:
   a second support member coupled to the first support member, wherein the second support member comprises a second actuation unit configured to rotate the first support member around a second rotational axis relative to the second support member,
   wherein the first rotational axis and the second rotational axis are two axes selected from the following: a roll axis, a pitch axis, and a yaw axis, and
   wherein the branched configuration of the single flexible member further includes a third end that is electrically coupled to the second actuation unit.

6. The apparatus of claim 5, wherein the single flexible member comprises a second connection portion connecting the second end and the third end, and wherein at least a portion of the second connection portion is configured to (i) wind around a portion of the first support member or the second support member when the first support member is rotated in a first direction around the second rotational axis, and (ii) unwind from the portion of the first support member or the second support member when the first support member is rotated in a second direction opposite the first direction around the second rotational axis.

7. The apparatus of claim 5, wherein the single flexible member is configured to transmit at least one of a power signal, payload data, sensor data, or control data between the payload, the payload mount, the first support member, and the second support member.

8. The apparatus of claim 5, further comprising:
a plurality of sensors integrated in the payload mount, the first support member, or the second support member,
wherein the plurality of sensors are configured to provide feedback signals to control a state of the payload, a rotation of the payload mount around the first rotational axis, or a rotation of the first support member around the second rotational axis.

9. An unmanned aerial vehicle (UAV), comprising:
a propulsion system;
a payload mount configured to be coupled to a payload to secure the payload;
a first support member coupled to one side of the payload mount in a single arm configuration, wherein the first support member comprises a first actuation unit configured to rotate the payload mount around a first rotational axis relative to the first support member;
a single flexible member comprising a branched configuration, wherein the branched configuration includes at least a first end that is electrically coupled to the payload mount and a second end that is electrically coupled to the first actuation unit; and
a controller configured to control the propulsion system, and to control the payload, the payload mount, or the first support member using the single flexible member.

10. The UAV of claim 9, wherein the single flexible member comprises a first connection portion connecting the first end and the second end, and wherein at least a portion of the first connection portion is configured to (i) wind around a portion of the payload mount or the first support member when the payload mount is rotated in a first direction around the first rotational axis, and (ii) unwind from the portion of the payload mount or the first support member when the payload mount is rotated in a second direction opposite the first direction around the first rotational axis.

11. The UAV of claim 9, wherein the first support member comprises a winding portion including at least a cavity, wherein the cavity is configured to receive at least a portion of the single flexible member when the payload mount is rotated around the first rotational axis.

12. The UAV of claim 11, wherein the winding portion further comprises a shaft disposed within the cavity, and wherein the single flexible member is configured to wind and unwind around the shaft when the payload mount is rotated around the first rotational axis.

13. The UAV of claim 9, further comprising:
a second support member coupled to the first support member, wherein the second support member comprises a second actuation unit configured to rotate the first support member around a second rotational axis relative to the second support member,
wherein the first rotational axis and the second rotational axis are two axes selected from the following: a roll axis, a pitch axis, and a yaw axis, and
wherein the branched configuration of the single flexible member further includes a third end that is electrically coupled to the second actuation unit.

14. The UAV of claim 13, wherein the single flexible member comprises a second connection portion connecting the second end and the third end, and wherein at least a portion of the second connection portion is configured to (i) wind around a portion of the first support member or the second support member when the first support member is rotated in a first direction around the second rotational axis, and (ii) unwind from the portion of the first support member or the second support member when the first support member is rotated in a second direction opposite the first direction around the second rotational axis.

15. The UAV of claim 13, wherein the single flexible member is further electrically coupled to the controller, and wherein the controller is configured to transmit control data to at least one of the payload, the payload mount, the first support member, and the second support member using the single flexible member.

16. An apparatus, comprising:
a payload;
a first support member coupled to one side of the payload in a single arm configuration, wherein the first support member comprises a first actuation unit configured to rotate the payload around a first rotational axis relative to the first support member;
a second support member coupled to the first support member, wherein the second support member comprises a second actuation unit configured to rotate the first support member around a second rotational axis relative to the second support member; and
a single flexible member comprising a branched configuration, wherein the branched configuration includes at least a first end that is electrically coupled to the payload, a second end that is electrically coupled to the first actuation unit, and a third end that is electrically coupled to the second actuation unit.

17. The apparatus of claim 16, wherein the single flexible member comprises a first connection portion connecting the first end and the second end, and wherein at least a portion of the first connection portion is configured to (i) wind around a portion of the payload or the first support member when the payload is rotated in a first direction around the first rotational axis, and (ii) unwind from the portion of the payload or the first support member when the payload is rotated in a second direction opposite the first direction around the first rotational axis.

18. The apparatus of claim 16, wherein the single flexible member comprises a second connection portion connecting the second end and the third end, and wherein at least a portion of the second connection portion is configured to (i) wind around a portion of the first support member or the second support member when the first support member is rotated in a first direction around the second rotational axis, and (ii) unwind from the portion of the first support member or the second support member when the first support member is rotated in a second direction opposite the first direction around the second rotational axis.

19. The apparatus of claim 16, wherein the first support member or the second support member comprises a winding portion including at least a cavity, wherein the cavity is configured to receive at least a portion of the single flexible member when the payload is rotated around the first rotational axis or when the first support member is rotated around the second rotational axis.

20. The apparatus of claim 19, wherein the winding portion further comprises a shaft disposed within the cavity, and wherein the single flexible member is configured to wind and unwind around the shaft when the payload is rotated around the first rotational axis or when the first support member is rotated around the second rotational axis.

* * * * *